United States Patent
Margalit

(10) Patent No.: US 12,182,260 B2
(45) Date of Patent: *Dec. 31, 2024

(54) SYSTEM AND METHOD FOR DETECTING FAULT INJECTION ATTACKS

(71) Applicant: NUVOTON TECHNOLOGY CORPORATION, Hsinchu Science Park (TW)

(72) Inventor: Ilan Margalit, Tel-Aviv (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 247 days.

This patent is subject to a terminal disclaimer.

(21) Appl. No.: 17/217,472

(22) Filed: Mar. 30, 2021

(65) Prior Publication Data
US 2021/0240823 A1    Aug. 5, 2021

Related U.S. Application Data

(63) Continuation-in-part of application No. 15/845,412, filed on Dec. 18, 2017, now Pat. No. 10,990,682.

(51) Int. Cl.
*G06F 21/00* (2013.01)
*G06F 21/54* (2013.01)
(Continued)

(52) U.S. Cl.
CPC ............ *G06F 21/556* (2013.01); *G06F 21/54* (2013.01); *G06F 21/554* (2013.01); *G06F 21/577* (2013.01)

(58) Field of Classification Search
CPC ...... G06F 21/556; G06F 21/54; G06F 21/554; G06F 21/577; G06F 2221/2113; G06F 21/552; G06F 11/00; H04L 63/1466
See application file for complete search history.

(56) References Cited

U.S. PATENT DOCUMENTS

| | | | |
|---|---|---|---|
| 4,860,288 A | 8/1989 | Teske et al. | |
| 5,867,409 A | 2/1999 | Nozuyama | |

(Continued)

FOREIGN PATENT DOCUMENTS

| | | |
|---|---|---|
| CN | 101192820 A | 6/2008 |
| KR | 101352149 B1 | 1/2014 |
| WO | 2014/119834 A1 | 8/2014 |

OTHER PUBLICATIONS http://www.invia.fr/detectors/voltage-glitch-detector.aspx; Oct. 22, 2016.

(Continued)

*Primary Examiner* — Kevin Ayala
(74) *Attorney, Agent, or Firm* — Oliff PLC

(57) ABSTRACT

A security system configured for deployment on a chip which is to be protected, the system comprising fault injection detection subsystem/s configured for deployment on the chip, each fault injection detection subsystem having plural sensitivity levels which are selectable in real time and comprising at least one hardware fault injection detector circuit/s, configured for deployment on the chip, and/or, coupled thereto, sensitivity level control logic which may be configured for deployment on the chip and which may be operative, in real time, to transition the fault injection detection subsystem, from its current sensitivity level from among said plural selectable sensitivity levels, to a next sensitivity level from among said plural selectable sensitivity levels, e.g. by generating sensitivity control signals (aka sensitivity level selections) and/or feeding the sensitivity control signals to at least one hardware fault injection detector in the subsystem.

22 Claims, 11 Drawing Sheets

(51) Int. Cl.
*G06F 21/55* (2013.01)
*G06F 21/57* (2013.01)

(56) References Cited

U.S. PATENT DOCUMENTS

| | | | |
|---|---|---|---|
| 6,154,045 | A | 11/2000 | Ye et al. |
| 6,167,479 | A | 12/2000 | Hartnett et al. |
| 6,216,218 | B1 | 4/2001 | Sollars |
| 6,735,732 | B2 | 5/2004 | Yamada |
| 6,844,761 | B2 | 1/2005 | Byun et al. |
| 7,702,992 | B2 | 4/2010 | Ogawa |
| 7,770,049 | B1 | 8/2010 | Searles et al. |
| 8,542,177 | B2 | 9/2013 | Lee |
| 8,612,995 | B1 | 12/2013 | Yun |
| 9,208,043 | B1 * | 12/2015 | Tseng .............. G01R 31/31816 |
| 9,523,736 | B2 | 12/2016 | Hershman et al. |
| 9,703,945 | B2 | 7/2017 | Hershman et al. |
| 9,729,988 | B2 | 8/2017 | Kropfitsch et al. |
| 10,671,726 | B1 * | 6/2020 | Paithane ............ H04L 63/1416 |
| 2005/0235179 | A1 | 10/2005 | Pistoulet |
| 2005/0251708 | A1 | 11/2005 | Bancel et al. |
| 2007/0075746 | A1 | 4/2007 | Fruhauf et al. |
| 2008/0284483 | A1 | 11/2008 | Nakashima |
| 2009/0038008 | A1 | 2/2009 | Pike |
| 2009/0315603 | A1 | 12/2009 | Bancel et al. |
| 2010/0082927 | A1 | 4/2010 | Riou |
| 2011/0029828 | A1 | 2/2011 | Bancel et al. |
| 2011/0234307 | A1 | 9/2011 | Marinet et al. |
| 2013/0099844 | A1 | 4/2013 | Kawaoka |
| 2013/0113572 | A1 | 5/2013 | Sharda et al. |
| 2013/0305078 | A1 | 11/2013 | Lee et al. |
| 2014/0075255 | A1 | 3/2014 | Lee et al. |
| 2014/0152334 | A1 * | 6/2014 | Ito .................... G01R 31/31725 324/750.02 |
| 2014/0219406 | A1 | 8/2014 | Chen et al. |
| 2014/0344932 | A1 | 11/2014 | Polychronakis et al. |
| 2015/0106872 | A1 | 4/2015 | Hiser et al. |
| 2015/0121327 | A1 | 4/2015 | Kamal et al. |
| 2015/0269298 | A1 | 9/2015 | Dai et al. |
| 2015/0280722 | A1 | 10/2015 | Liu et al. |
| 2015/0323959 | A1 | 11/2015 | Arabi |
| 2015/0369865 | A1 * | 12/2015 | Hershman ............ H03K 19/003 326/8 |
| 2016/0028381 | A1 | 1/2016 | Tasher |
| 2016/0028394 | A1 | 1/2016 | Tasher et al. |
| 2016/0105282 | A1 | 4/2016 | Henry et al. |
| 2016/0110274 | A1 | 4/2016 | Ito et al. |
| 2017/0344438 | A1 * | 11/2017 | Bilgiday ............ G06F 11/0784 |
| 2018/0060202 | A1 * | 3/2018 | Papak ................. G06F 11/3409 |
| 2018/0173534 | A1 | 6/2018 | Peled et al. |
| 2018/0349612 | A1 * | 12/2018 | Harel ................. G06F 11/0793 |

OTHER PUBLICATIONS

Loic Zussa et al.; Efficiency of a glitch detector against electromagnetic fault injection; DATE: Design, Automation and Test in Europe, Mar. 2014, Dresden, Germany; IEEE, pp. 1-6, 2014; Design, Automation and Test in Europe Conference and Exhibition (DATE), 2014.

J. Balasch et al.; Sep. 2011; An In-depth and Black-box Characterization of the Effects of Clock Glitches on 8-bit MCUs; In Fault Diagnosis and Tolerance in Cryptography (FDTC), 2011 Workshop on (pp. 105-114); IEEE.

M.S. Kelly et al.; May 2017; Characterising a CPU fault attack model via run-time data analysis; In Hardware Oriented Security and Trust (HOST); 2017 IEEE International Symposium on (pp. 79-84). IEEE.

N. Moro et al.; May 2014; Experimental evaluation of two software countermeasures against fault attacks; In Hardware-Oriented Security and Trust (HOST); 2014 IEEE International Symposium on (pp. 112-117). IEEE.

N. Moro et al.; Aug. 2013; Electromagnetic fault injection: towards a fault model on a 32-bit microcontroller; In Fault Diagnosis and Tolerance in Cryptography (FDTC); 2013 Workshop on (pp. 77-88). IEEE.

B. Giller; Implementing practical electrical glitching attacks; Black Hat Europe; Nov. 2015.

T. Barry et al.; Jan. 2016; Compilation of a countermeasure against instruction-skip fault attacks; In Proceedings of the Third Workshop on Cryptography and Security in Computing Systems (pp. 1-6); ACM.

A. Barenghi et al.; 2010; Low-Cost Software Countermeasures Against Fault Attacks: Implementation and Performances Trade Offs.; In Proc. of the 5th workshop on Embedded Security, WESS (pp. 7-1).

M. McDonald et al.; "Basic Operation of a DLX Machine"; https://www.cs.umd.edu/~meesh/cmsc411/website/projects/dlx/proj.html; Aug. 1, 2015.

http://infocenter.arm.com/help/index.jsp?topic=/com.arm.doc.ddi0432c/CHDCICDF.html; 2009.

https://www.tutorialspoint.com/assembly_programming/assembly_loops.htm; Nov. 3, 2017.

A.G. Yanci et al.; Aug. 2009; Characterization of a voltage glitch attack detector for secure devices; In Bio-inspired Learning and Intelligent Systems for Security, 2009. BLISS '09. Symposium on (pp. 91-96). IEEE.

W. He et al.; Dec. 2016; Cheap and cheerful: a low-cost digital sensor for detecting laser fault injection attacks; In International Conference on Security, Privacy, and Applied Cryptography Engineering (pp. 27-46).; Springer, Cham.

https://en.wikipedia.org/wiki/Central_processing_unit#Structure_and_implementation; Nov. 6, 2017.

https://en.wikipedia.org/wiki/Instruction_cycle; Nov. 8, 2017.

https://en.wikipedia.org/wiki/Instruction_pipelining; Nov. 11, 2017.

Domenico Cotroneo, "Fault Injection for Software Certification", 2013, IEEE, pp. 38-45 (Year: 2013).

Bilgiday Yuce, "Improving Fault Attacks on Embedded Software using RISC Pipeline Characerization", 2015, Virginia TEch, pp. 97-108 (Year: 2015).

https://www.nuvoton.com/support/technical-support/technical-articles/TSNuvotonTechBlog-000154/ (retrieved on May 20, 2021).

https://www.chipestimate.com/log.php?from=%2FInvia%2FVoltage-Glitch-Detector%2Fdatasheet%2Fip%2F30894&logerr=1>(retrieved on May 20, 2021).

https://www.design-reuse.com/sip/glitch-detector-tsmc-n5-ip-48440/, 2020 (retrieved on May 20, 2021).

* cited by examiner

Fig. 1 (Prior Art)

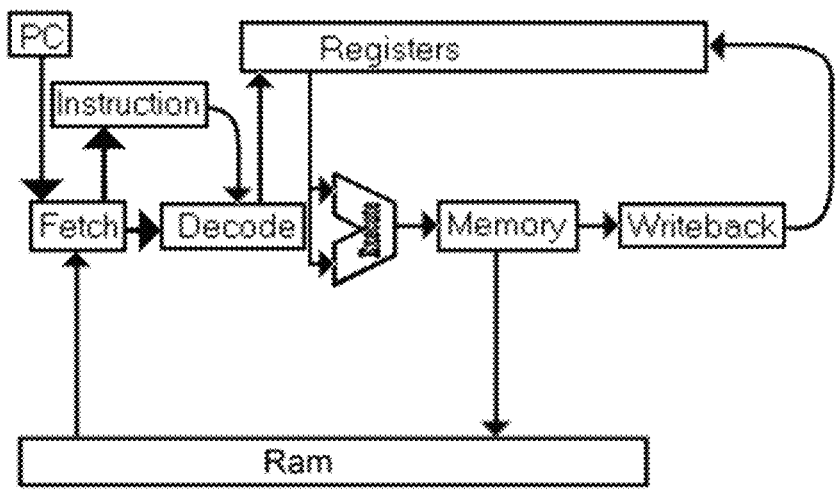

Fig. 2

1. provide processor core / CPU which is vulnerable to fault injection and which produces signals indicating which instruction/opcode, or family/group of opcodes, is executed at any given moment.
↓
2. risk analysis : system designer associates security risk e.g. risk of fault injection to a list of opcodes or groups of opcodes and generates sensitivity level decision/selection logic accordingly. For example: conditional branch opcodes – high risk; all other opcodes – low risk
↓
3. provide fault injection detector with at least two sensitivity levels
↓
4. implement sensitivity-level adjustment of CM circuit e.g. provide a CM circuit whose sensitivity level is adjustable in real time, say by dynamic selection of one of the at least two levels. Typically, the fault injection detector supports dynamic e.g. real-time adjustment of sensitivity levels which operates in real time and has a response time which is shorter than the decode-execution cycle of a single instruction by the processor or CPU being secured by the fault injection detector.

Fig. 4

310. CPU provides opcode indicator I to sensitivity level control module

320: sensitivity level decision/selection logic in sensitivity level control module generates a decision: CM circuit's sensitivity level should be L_I 330: sensitivity level control module signals (or commands) sensitivity level control module to adjust cm circuit's sensitivity level to L_I 340: responsively, sensitivity level control module issues a sensitivity level control signal to the CM circuit 350: CM circuit adjusts its sensitivity level to L_I. The level may, for example, be adjusted using a suitable selector element whose controls comprise, or are derived from, the sensitivity level control command which are indicative of which opcode is about to be executed.

SYSTEM AND METHOD FOR DETECTING FAULT INJECTION ATTACKS

REFERENCE TO CO-PENDING APPLICATIONS

This application is a continuation-in-part of U.S. patent application Ser. No. 15/845,412, entitled "System and method for coping with fault injection attacks" and filed on Dec. 18, 2017. The disclosure of the prior application is hereby incorporated by reference herein in its entirety.

FIELD OF THIS DISCLOSURE

The present invention relates generally to device security, and more particularly to detecting fault injection attacks.

BACKGROUND FOR THIS DISCLOSURE

Co-owned U.S. Pat. No. 9,523,736 and its prior art describe state of the art methods for identifying fault injection attempts.

Countermeasure mechanisms, whose sensitivity levels are adjustable, may be known Glitch detectors, which are known and described e.g. in the following http www link: invia.fr/detectors/voltage-glitch-detector.aspx—these are described as having "configurable detection thresholds"; and in the following https link: hal.inria.fr/emse-01099006/document and "An In-depth and Black-box Characterization of the Effects of Clock Glitches on 8-bit MCUs" by Josep Balasch, Benedikt Gierlichs, and Ingrid Verbauwhede is a white paper, available from IEEE, which describes fault injection research.

"Characterising a CPU Fault Attack Model via Run-Time Data Analysis" by Martin S. Kelly et al is a white paper, available from IEEE, which describes fault injection research.

"Experimental evaluation of two software countermeasures against fault attacks" by Nicolas Moro et al is a white paper, available from IEEE, which evaluates software countermeasures.

"Electromagnetic fault injection: towards a fault model on a 32-bit microcontroller" by Nicolas Moro et al is a white paper, available from IEEE, which describes fault injection research.

State of the art knowledge regarding glitching attacks is described in NCC Group's "Implementing Practical Electrical Glitching Attacks", dated November 2015 and available via Internet at the following https www link: blackhat-.com/docs/eu-15/materials/eu-15-Giller-Implementing-Electrical-Glitching-Attacks.pdf. Countermeasures in software, e.g. duplication of instructions, are described in: "Compilation of a Countermeasure Against Instruction-Skip Fault Attacks" by Thierno Barry, Damien Couroussé, Bruno Robisson and available via Internet at the following https link: hal-cea.archives-ouvertes.fr/cea-01296572/document, and in "Low-Cost Software Countermeasures Against Fault Attacks: Implementation and Performances Trade Offs" and available via Internet at http://euler.ecs.umass.edu/research/bpbk-WESS-2010.pdf.

Authentication mechanisms which operate based on tracking the execution flow of the CPU, exist, for example co-owned U.S. Pat. No. 9,703,945.

Prior art FIG. 1 herein is taken from "Basic Operation of a DLX Machine" by Mike McDonald and Tony Jacobs, available online at the following https www link: cs.um-d.edu/class/fall2001/cmsc411/projects/DLX/proj.html.

This article https://www.nuvoton.com/support/technical-support/technical-articles/TSNuvotonTechBlog-000154/ presents "random delays and random variations in the order of running processes", both of which yield unpredictable system execution timing, as countermeasures against fault injection attacks.

Conventional glitch detectors are described in U.S. Pat. No. 9,729,988B2 entitled "Glitch detection . . . " and in https://www.chipestimate.com/log.php?from=%2FInvia %2FVoltage-Glitch-Detector %2Fdatasheet %2Fip %2F30894&logerr=1 and in https://www.design-reuse.com/sip/glitch-detector-tsmc-n5-ip-48440/and in https://hal.archives-ouvertes.fr/lirmm-01096047/.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Fault injection is a widely used and highly effective (from a hacker's point of view) technique. Certain embodiments seek to provide improved protection against fault injection attacks or instruction-skip fault attacks.

Security systems are measured by their rate of false positives, aka false alarms, as well as the level of security they provide. Certain embodiments of the present invention seek to provide a system which takes advantage of the fact that often, out of 100% of system operation time, there are periods of lower security risk, such as but not limited to periods which, empirically, have been observed to be less popular for hacking, and there are periods of higher security risk, such as but not limited to periods which, empirically, have been observed to be more popular for hacking. The system then restricts the time during which a system is more sensitive to security threats, to the second type of period, thereby reducing the system's susceptibility to false alarms in total, making the system more secure, while not affecting availability and usability relative to placing the system in highest sensitivity to fault injection 100% of the time.

Certain embodiments seek to provide a fault injection detector having dynamic e.g. real-time adjustment of sensitivity levels which operates in real time, having a response time which is shorter than the decode-through-execution cycle of a single instruction by the CPU being secured by the fault injection detector. Typically, detection is continuous, rather than at intervals.

Turning countermeasures on and off, depending on a chip's state, e.g. depending on whether the chip is active or in a sleep state, may or may not be known in the art. Certain embodiments shown and described herein seek to adjust sensitivity levels in real time so as to fine-tune tradeoffs inherent in devices which provide attack protection at the expense of some false positives. Typically, control over countermeasures is provided at a resolution of a single opcode e.g. because a first, perhaps low-sensitivity level, may be provided upon detection of a first opcode, yielding a first tradeoff which provides lower level detection and suffers from a lower level of false alarms, and a second, perhaps higher sensitivity level, may be provided upon detection of an upcoming, second opcode just following the first opcode, yielding a second tradeoff which provides a higher level of detection at the cost of a higher level of false alarms.

Certain embodiments of the present invention seek to provide a security system and/or method and/or computer program product which, dynamically, depending on a CPU's execution flow, controls fault injection countermeasure circuitry operative to protect the CPU from fault injection attacks. For example, a CPU or processor core may be provided which, when in use, generates, in real time, output indications of at least one conditional branch about to be executed. Typically, responsive to an output indication of a conditional branch about to be executed, the sensitivity level configuration module is operative to select a next sensitivity level which is higher than at least one sensitivity level selected by the sensitivity level configuration module if at least one instruction other than a conditional branch is about to be executed by the processor core.

There are also provided at least the following embodiments:

Embodiment 1. A security system which dynamically, depending on processor core execution flow, controls fault injection countermeasure circuitry operative to protect the processor core from fault injection attacks, the system comprising:
  i. a processor core which, when in use, executes instructions and, concurrently, generates, in real time, output indications of at least some instructions which are about to be executed;
  ii. a fault injection detector having plural selectable sensitivity levels; and
  iii. a sensitivity level control module operative, in real time,
    to receive the output indications,
    to select a next sensitivity level from among the plural selectable sensitivity levels using sensitivity level selection logic which receives at least the output indications as inputs and
    to set the fault injection detector to the next sensitivity level,
  thereby to provide fault injection countermeasure circuitry which is differentially sensitive, when protecting the processor core from fault injection attacks, depending on the output indications of the at least some instructions, avoids at least one false alarm which would result if processor core protection were provided at a sensitivity level unrelated to the output indications of the at least some instructions.

Embodiment 2. A system according to any of the preceding embodiments wherein when the sensitivity level control module receives an output indication of an individual instruction associated with a risk level R, the sensitivity level control module responsively selects a next sensitivity level which is higher than a sensitivity level selected for at least one instruction associated with a risk level lower than R.

Embodiment 3. A system according to any of the preceding embodiments wherein when the sensitivity level control module receives an output indication of an individual instruction determining a processor core return from an interrupt handler, the sensitivity level control module responsively selects a next sensitivity level which is higher than a sensitivity level selected for at least one instruction other than the individual instruction.

Typically, when the CPU finishes executing the if-statement, the sensitivity reverts to a lower level, unless the upcoming opcode indicates that the upcoming instruction about to be executed by the processor core is another conditional branch or other opcode regarding which the sensitivity level configuration module is operative to select a high sensitivity level. Generally, the output indications are signals which indicate what is about to be executed by the processor core at the current moment and the sensitivity level is set accordingly by the sensitivity level configuration module. When the output indication of the next or upcoming opcode comes along, the sensitivity level is again adjusted accordingly, hence may remain the same or change, depending on whether opcode that follows is the same as the preceding opcode (or corresponds in the logic, to a sensitivity level which happens to be the same as the level that corresponds to the previous opcode).

Embodiment 4. A system according to any of the preceding embodiments wherein when the sensitivity level control module receives an output indication of an individual instruction determining a routine return address, the sensitivity level control module responsively selects a next sensitivity level which is higher than a sensitivity level selected for at least one instruction other than the individual instruction.

Embodiment 5. A system according to any of the preceding embodiments wherein when the sensitivity level control module receives an output indication of an individual instruction determining a stop condition for a loop, the sensitivity level control module responsively selects a next sensitivity level which is higher than a sensitivity level selected for at least one instruction other than the individual instruction.

Embodiment 6. A system according to any of the preceding embodiments wherein when the sensitivity level control module receives an output indication of an individual instruction determining a processor core execution mode change, the sensitivity level control module responsively selects a next sensitivity level which is higher than a sensitivity level selected for at least one instruction other than the individual instruction.

An execution mode change may, for example, include changing between a privileged mode, where code is entitled to access certain restricted resources (e.g. certain memory zones, certain hardware functions or other specific resources), and a non-privileged mode, where code is not entitled to access the restricted resources.

Embodiment 7. A system according to any of the preceding embodiments wherein when the sensitivity level control module receives an output indication of an individual instruction which reads data from memory, the sensitivity level control module responsively selects a next sensitivity level which is lower than a sensitivity level selected for at least one instruction other than the individual instruction.

Embodiment 8. A system according to any of the preceding embodiments wherein the processor core comprises a memory and wherein, when the sensitivity level control module receives an output indication of an individual instruction which reads data from memory into a local storage device (e.g. a cache or register), the sensitivity level control module responsively selects a next sensitivity level which is lower than a sensitivity level selected for at least one instruction other than the individual instruction.

Embodiment 9. A system according to any of the preceding embodiments wherein when the sensitivity level control module receives an output indication of an individual instruction comprising a conditional branch, the sensitivity level control module responsively selects a next sensitivity level which is higher than a sensitivity level selected for at least one instruction other than the individual instruction.

It is appreciated that conditional branches may be associated with a high risk level, since conditional branches may be attractive targets for hackers seeking a worthwhile target, in a given code, to attack. For example, a conditional branch may be an attractive target for a hacker because the branch may route the code flow either to a first option which grants an end-user secret information, or to a second option which deems the end-user non-authentic, hence does not provide the secret information.

Embodiment 10. A system according to any of the preceding embodiments wherein at least one output indication, pertaining to an instruction I, is generated when the processor core is about to execute instruction I thereby to provide an output indication that instruction I is about to be executed, before execution of the instruction I.

Embodiment 11. A system according to any of the preceding embodiments wherein the processor core includes adapted decode logic which at least once decodes an individual instruction fetched from program memory thereby to derive at least one CPU-internal signal which subsequently operates at least one unit of the CPU thereby to execute the individual instruction, and wherein the decode logic is further adapted to provide, before the at least one unit operates responsive to the at least one CPU-internal signal derived from the individual instruction fetched from program memory, an output indication of the individual instruction, thereby to allow the fault injection detector to be set to the next sensitivity level before the individual instruction is executed, rather than after.

Embodiment 12. A system according to any of the preceding embodiments wherein the core decodes opcodes thereby to generate signals which comprise instructions to the core's execution units and the output indications comprise signals exported from the core which are indicative of the instructions decoded from the opcodes, thereby to provide to the sensitivity level selection logic a preview of an instruction yet to be executed by the processor core.

Embodiment 13. A system according to any of the preceding embodiments wherein the signals exported from the core comprise the instructions decoded from the opcodes.

Embodiment 14. A system according to any of the preceding embodiments wherein the fault injection detector comprises an analog circuit having plural tuning options respectively corresponding to the plural sensitivity levels.

Embodiment 15. A system according to any of the preceding embodiments wherein the processor core includes adapted decode logic which at least once decodes an individual instruction fetched from program memory thereby to derive at least one CPU-internal signal which subsequently operates at least one unit of the CPU thereby to execute the individual instruction, and wherein, for all instructions decoded by the decode logic, the decode logic is further adapted to provide, before the at least one unit operates responsive to the at least one CPU-internal signal derived from the individual instruction fetched from program memory, an output indication of the individual instruction, thereby to ensure the fault injection detector is always set to each specific sensitivity level before an instruction used by the sensitivity level logic to select the specific sensitivity level is executed, rather than after.

Embodiment 16. A security method which, dynamically, depending on processor core execution flow, controls fault injection countermeasure circuitry operative to protect the processor core from fault injection attacks, the method comprising:
i. providing a processor core which, when in use, executes instructions and concurrently, generates, in real time, output indications of at least some instructions which are about to be executed;
ii. providing a fault injection detector having plural controllable sensitivity levels; and
iii. in real time, using a sensitivity level control module,
to receive the output indications,
to select a next sensitivity level from among the plural controllable sensitivity levels using sensitivity level selection logic which receives at least the output indications as inputs and
to set the fault injection detector to the next sensitivity level,
thereby to provide fault injection countermeasure circuitry which is differentially sensitive, when protecting the processor core from fault injection attacks, depending on the output indications of the at least some instructions, avoiding at least one false alarm which would result if CPU protection were provided at a sensitivity level unrelated to the output indications of the at least some instructions.

Embodiment 17. A system according to any of the preceding embodiments and also comprising fault injection amelioration circuitry configured to perform at least one fault injection amelioration operation, responsive to detection of a fault injection by the detector.

Embodiment 18. A method according to any of the preceding embodiments wherein the processor core includes adapted decode logic which at least once decodes an individual instruction fetched from program memory thereby to derive at least one CPU-internal signal which subsequently operates at least one unit of the CPU thereby to execute the individual instruction, and wherein the decode logic is further adapted to provide, before the at least one unit operates responsive to the at least one CPU-internal signal derived from the individual instruction fetched from program memory, an output indication of the individual instruction, thereby to allow the fault injection detector to be set to the next sensitivity level before the individual instruction is executed, rather than after.

Embodiment 19. A method according to any of the preceding embodiments wherein the core decodes opcodes by applying combinational logic thereto thereby to generate signals which comprise instructions to the core's execution units and the output indications comprise signals exported from the core which are indicative of the instructions decoded from the opcodes, thereby to provide to the sensitivity level selection logic a preview of an instruction yet to be executed by the processor core.

Embodiment 20. A system according to any of the preceding embodiments wherein the processor core includes an execution pipeline including plural consecutive instructions having at least one overlapping phase, wherein the sensitivity level selection logic provides, to the fault injection detector, an indication for selecting a sensitivity level according to at least one instruction I which, standalone, is associated with a highest fault detection sensitivity level from among the plural sensitivity levels.

The overlapping phase/s may comprise a decode phase and/or an execution phase.

Embodiment 21. A system according to any of the preceding embodiments where the at least one instruction I, once decoded, takes priority over all other instructions being decoded and takes priority over all other instructions about to be executed in that the highest detection sensitivity level is set starting immediately upon decoding of the instruction I and ending only after the instruction I has been fully executed, irrespective of the other instructions being decoded and the other instructions about to be executed.

Embodiment 22. A system according to any of the preceding embodiments wherein the processor core output indications comprise output indications of which op-code is about to be executed.

Embodiment 23. A system according to any of the preceding embodiments wherein the fault injection detector is operative to protect a CPU, whose decode-execution cycle for a single instruction is T time units long, from fault injection attacks, and wherein the fault injection detector has a response time which is shorter than T.

Embodiment 24. A system according to any of the preceding embodiments wherein the fault injection detector comprises plural fault injection detector units deployed in plural processor core locations respectively, thereby to detect fault injection attacks at all of the plural locations.

Embodiment 25. A system according to any of the preceding embodiments wherein the fault injection detector alerts if at least one of the detector units, deployed at location L, detects a fault injection attack at location L.

Embodiment 101. A security system configured for deployment on a chip which is to be protected, the system comprising:
  at least one fault injection detection subsystem configured for deployment on the chip, each fault injection detection subsystem having plural sensitivity levels which are selectable in real time and comprising:
    at least one hardware fault injection detector circuit/s, configured for deployment on the chip, and, coupled thereto,
    sensitivity level control logic configured for deployment on the chip and operative, in real time, to transition the fault injection detection subsystem, from its current sensitivity level from among the plural selectable sensitivity levels, to a next sensitivity level from among the plural selectable sensitivity levels, by generating sensitivity control signals (aka sensitivity level selections) and feeding the sensitivity control signals to at least one hardware fault injection detector in the subsystem.

Fault injection detection subsystems may include any logic configured for
  fault injection attack detection, typically including identifying an attempt to tamper with chip circuitry, in real time, and responsively, alerting in real time about the attempt. The location of detectors is typically indicative of the location of the chip circuitry most likely under attack, and the nature of the detectors is typically indicative of the type of attack, e.g. glitch, temperature or other.

Embodiment 102. The system according to any of the preceding embodiments and wherein the at least one fault injection subsystem also comprises at least one functional module/s configured for deployment on the chip which generate/s output signal/s in real time, and feeds the output signals to the sensitivity level control logic thereby to provide the sensitivity level control logic with indications as to the next sensitivity level to be selected from among the plural selectable sensitivity levels.

Embodiment 103. The system according to any of the preceding embodiments wherein the at least one functional module is operative to generate, and to feed to the sensitivity level control logic, at least one output signal comprising a status indication which indicates whether or not the module is active, and wherein the logic selects the next level depending at least partly on the status indication.

Embodiment 104. The system according to any of the preceding embodiments wherein the logic, at least once, selects a higher next level responsive to the at least one individual module from among the functional modules becoming active.

Embodiment 105. The system according to any of the preceding embodiments wherein the at least one output signal represents a level of risk associated with a current activity of the at least one functional module and wherein the sensitivity control logic derives, at least partly from the level of risk, a sensitivity level to be selected as the next level.

Embodiment 106. The system according to any of the preceding embodiments wherein the logic selects a first sensitivity level as the next level if the functional module is active and has a first level of risk, a second sensitivity level as the next level if the functional module is active and has a second level of risk, lower than the first level of risk, and a third sensitivity level as the next level if the functional module is inactive.

Embodiment 107. The system according to any of the preceding embodiments 1 wherein the chip has multiple possible power states including at least one idle state/s and at least one awake state/s and wherein the logic selects the next level responsive to a new state of the chip, the new state comprising one of the multiple possible states.

Embodiment 108. The system according to any of the preceding embodiments wherein the functional module comprises firmware which triggers transitions between the possible power states thereby to cause the current state to be known to the sensitivity control logic.

Embodiment 109. The system according to any of the preceding embodiments wherein the next level is selected before the chip's power state transitions to the new state.

Embodiment 110. The system according to any of the preceding embodiments wherein the detector is set to the next level before the chip's power state transitions to the new state.

Embodiment 111. The system according to any of the preceding embodiments wherein the next level is selected after the chip's power state has transitioned to the new state.

Embodiment 112. The system according to any of the preceding embodiments wherein the detector is set to the next level after the chip's power state has transitioned to the new state.

Embodiment 113. The system according to any of the preceding embodiments wherein the system is deployed on the chip to be protected.

Embodiment 114. The system according to any of the preceding embodiments wherein the at least one fault injection detection subsystem comprises plural fault injection detection subsystems, each configured for deployment on the chip and each including a hardware fault injection detector and sensitivity level control logic coupled thereto.

Embodiment 115. The system according to any of the preceding embodiments wherein the system is deployed on the chip to be protected, wherein the at least one functional module/s comprise at least first and second functional modules, and wherein the plural subsystems include first and second subsystems which are respectively protecting the first and second functional modules and wherein the first module is closer to the first subsystem than is the second module, and the second module is closer to the second subsystem than is the first module.

Embodiment 116. The system according to any of the preceding embodiments and wherein at least one subsystem S from among the plural fault injection detection subsystems protects at least one functional module on the chip, and wherein each individual detector from among the plural subsystems' respective hardware fault injection detectors has a sensitivity level selected, in real time, by at least one functional module which is protected by the individual detector.

Embodiment 117. The system according to any of the preceding embodiments and wherein each of the detector/s has plural sensitivity levels which are selectable in real time.

Embodiment 118. The system according to any of the preceding embodiments and wherein the subsystem comprises plural detectors and wherein the sensitivity level of the subsystem at time t is implemented as a number of detectors, from among the plural detectors, which are enabled at the time t and wherein the sensitivity control logic determines how many of the plural detectors are enabled at time t, thereby to provide a counter-measure with a real-time configurable sensitivity level such that lower sensitivity levels are implemented by smaller numbers of activated detector circuits, and higher sensitivity levels are implemented by larger numbers of activated detector circuit.

Embodiment 119. The system according to any of the preceding embodiments wherein the at least one functional module/s comprises plural functional modules and wherein the sensitivity control logic derives a sensitivity level to be selected as the next level by combining output indications from each of the plural functional modules, into a single set of sensitivity control signals.

Embodiment 120. The system according to any of the preceding embodiments wherein the logic, at least once, releases to a level which is lower than the higher next level, responsive to at least the individual module becoming inactive.

Embodiment 121. The system according to any of the preceding embodiments wherein the functional module comprises a cryptographic module which is associated with a high level of risk.

It is appreciated that certain embodiments may, if desired, be implemented as a computer program-driven CM sensitivity control product including a computer program which is typically more real-time than the execution of the processor core to be protected thereby. There is therefore provided a computer program product, comprising a non-transitory tangible computer readable medium having computer readable program code embodied therein, the computer readable program code adapted to be executed to implement a security method which, dynamically, depending on processor core execution flow, controls fault injection countermeasure circuitry operative to protect the processor from fault injection attacks, the method comprising:
i. providing a processor core which, when in use, executes instructions and concurrently, generates, in real time, output indications of at least some instructions which are about to be executed;
ii. providing a fault injection detector having plural controllable sensitivity levels; and
iii. in real time, using a sensitivity level control module, to receive the output indications,
to select a next sensitivity level from among the plural controllable sensitivity levels using sensitivity level selection logic which receives at least the output indications as inputs and to set the fault injection detector to the next sensitivity level,
thereby to provide fault injection countermeasure circuitry which, being respondent, when protecting the CPU from fault injection attacks, to the output indications of the at least some instructions, avoids at least one false alarm which would result if CPU protection were provided at a sensitivity level unrelated to the output indications of the at least some instructions.

Alternatively or in addition, the fault injection countermeasure circuitry may, if the sensitivity level if set to completely avoid false alarms, detect at least one fault injection which would not be detected if CPU protection were provided at a sensitivity level unrelated to the output indications of the at least some instructions.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission, or display devices. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

Certain embodiments of the present invention are illustrated in the following drawings:

FIG. 1 is a prior art diagram illustrating a conventional CPU operation cycle which, significantly, typically includes, inter alia, a process of fetching, which is followed by decoding, which is followed by execution.

FIG. 2 is a simplified flow diagram of a method for building a system in accordance with certain embodiments.

FIG. 4 is a simplified flow diagram of a method for real-time operation of a dynamic sensitivity-level adjustment system in accordance with certain embodiments.

Figure 3:
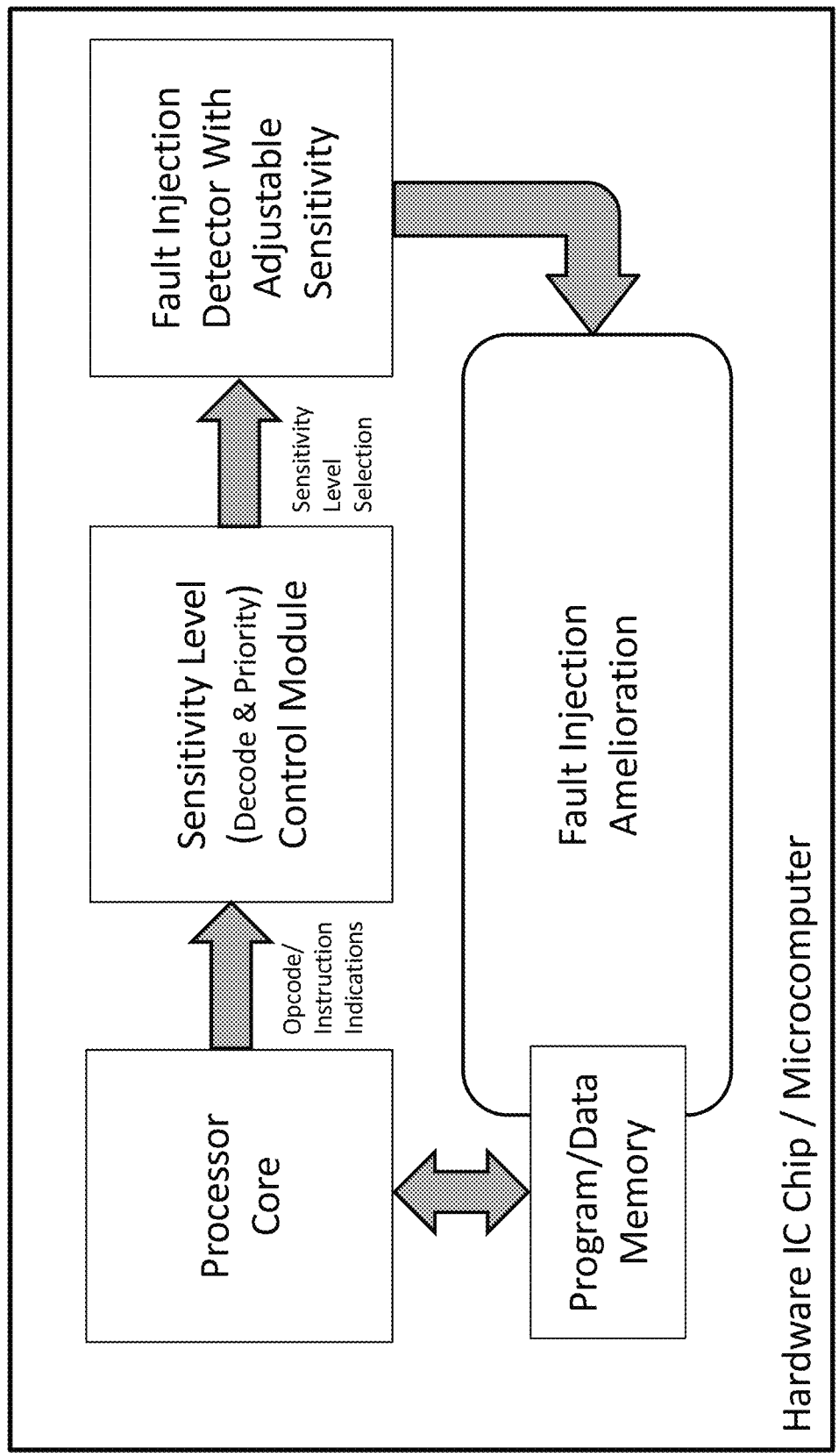
FIG. 3 is a simplified block diagram illustration of a security system according to certain embodiments, which is typically characterized in that instructions executed by a processor core or CPU become the trigger for adjusting a fault injection attack detector that is protecting that core from these attacks, e.g. execution of a conditional branch or other portion of code which is deemed at high risk of being hacked, may trigger an adjustment of the detector in real time to be more sensitive.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Any logical functionality described herein may be implemented as a real time application, if and as appropriate, and which may employ any suitable architectural option such as but not limited to ASIC or DSP or any suitable combination thereof. Any hardware component mentioned herein may in fact include either one or more hardware devices e.g. chips, which may be co-located, or remote from one another.

DETAILED DESCRIPTION OF CERTAIN EMBODIMENTS

"Basic Operation of a DLX Machine" by Mike McDonald and Tony Jacobs, available online at the following https www internet link, with an html suffix: cs.umd.edu/class/fall2001/cmsc411/projects/DLX/proj, describes inter alia five stages of execution in the DLX architecture: Instruction Fetch (IF), Instruction Decode (ID), Execution (EX), Memory (MEM) and Write-Back (WB). Each stage takes as much time as the slowest one, even if it does not need this much time to complete. This time period is a clock cycle. Therefore, each instruction takes a total of 5 clock cycles from start to finish to execute. Each stage of execution corresponds to hardware in the CPU, as can be seen in the FIG. 3.1 of Hennessy and Patterson. Each "section" of hardware along the data path can operate concurrently, which pipelining takes advantage of to gain enormous performance benefits. Very specific operations are done in each stage.

1. Instruction Fetch (IR)—Read the instruction from memory and put it into the instruction register (IR). Update the new program counter (NPC) so that it points to the next instruction (PC+4, or the next word in memory).

2. Instruction Decode (ID)—Decode the instruction (based on opcode). The output of registers (Regs[$IR_{6...10}$]) and Regs[$IR_{11...15}$]) from the register file is placed into temporary registers "A" and "B". Sign extend the portion of the instruction that could be an immediate value and put this value into temporary register "Imm".

3. Execution (EX)—What happens here depends on what type of instruction is about to be executed. The ALU operates in this cycle, performing the desired operation.

FIG. 1 is a prior art diagram illustrating a conventional CPU cycle which, significantly, typically includes inter alia a process of fetching, which is followed by decoding, which is followed by execution.

Systems for fault injection countermeasure sensitivity adjustment are now described in detail.

"If" statements or conditional branches are examples of CPU instructions which may be vulnerable to fault injections aka "fault injection attacks" e.g. may serve as targets for fault injections, e.g. points where the flow of a program is likely to be deliberately hacked. For example, a conditional branch may be configured either to jump to a code section which provides a user with some secret information, based on a preceding operation, e.g. conditional on the user having successfully provided user authentication in a previous operation, or jump somewhere else, or not jump at all, either of which would not provide the user with the requested information (if the user fails to successfully provide user authentication in the previous operation). In the latter case, a hacker might try injecting at a certain time, a "fault" striving to fool the conditional branch instruction into jumping to the code that does provide the secret information, even if the necessary user authentication was not provided by that user in the previous operation.

According to certain embodiments, a security system is provided in which a processor core, when in use e.g. in real time, indicates which op-code/instruction is about to be executed. For example, the CPU when fetching an instruction from program memory, typically first decodes the instruction. Decoding of the instruction typically comprises logic functions taking as input the opcode, usually in binary form (instruction opcodes typically comprise numbers stored typically sequentially as the binary code of the respective program, which may be interleaved with instruction operands) and applying logic functions (aka "decode logic") which yield CPU-internal signals adapted to operate the CPU's various units to perform respective functions, e.g. to operate the CPU's ALU to perform an arithmetic operation, and so forth. According to certain embodiments, the decode logic may be adapted to output the decoded signals, inter alia, to a subsystem (e.g. a sensitivity-level control module) outside the CPU, to enable that subsystem, despite being external to the CPU, to take action (e.g. to select a sensitivity level) responsive to advance knowledge characterizing what the CPU is on the verge of doing at a given time.

It is appreciated that, conventionally, built-in CPU decode logic is designed specifically to control the operational units of the CPU, e.g. ALU, according to the instruction being processed, and the CPU does not "know" which instruction is about to be executed at any given time. In contrast, according to certain embodiments, the decode logic output typically indicates which instruction is now about to be executed. Furthermore, inside the CPU instruction may have overlapping control states. For example, two (or N) different instructions of one family may have some of the same internal controls because the two different instructions operate the same CPU blocks.

A particular advantage of adapting the decode logic to communicate with the external subsystem may be that since decoding precedes the actual performance of the decoded instruction by the relevant CPU unit (say, by the ALU), the external subsystem is being given a preview of an instruction that the CPU has yet to actually act upon.

It is appreciated that some ICs implement low-power modes. For example, an IC may enter low-power mode upon detecting that the core is executing some specific predefined instruction, such as, in some CPUs, a WAIT instruction, or some other type of HALT instruction, or a Wait-For-Interrupt, all of which may typically put the CPU's core in a hold state, in which the core typically remains, waiting for an event to trigger the core's exit from that hold state. This would involve a real-time indication of which op-code/instruction is about to be executed.

Authentication mechanisms which operate based on tracking the execution flow of the CPU, exist, for example co-owned U.S. Pat. No. 9,703,945. The execution flow may be put on hold to authenticate the code when a specific set of instructions is executed. Specifically, U.S. Pat. No. 9,703,945 describes authentication mechanisms which operate based on tracking the execution flow of the CPU. U.S. Pat. No. 9,703,945 describes specific operations or instructions—for example, access to a certain space of memory-mapped I/O addresses—which, by the decision of the system designer, are deemed to require a greater level of security in terms of code authentication. So, upon detection of such an instruction, e.g. a write operation to that I/O address space, the execution flow is temporarily halted until a certain code authentication sequence has been completed. Once this is done, and assuming the respective code is authenticated, the execution flow is resumed and the operation carried out. So, the method, triggered by certain instructions, alters the flow of the program to take some predefined action, namely authentication of the code.

Inter alia, U.S. Pat. No. 9,703,945 describes a processing core, which is coupled to receive program instructions from the input bridge and execute these program instructions, wherein the program instructions include both program instructions which are capable of outputting signals through the output bridge, and program instructions that do not send data to the one or more system outputs, and wherein the processing core can execute program instructions that do not send data to the one or more system outputs both when the output bridge is in the first state, and when the output bridge is in the second state.

The term "sensitivity level" is intended to include any cut-off point or threshold, applied by a fault injection detector to any criterion or trigger characteristic of or correlative to fault injection which may be reacted to by the fault injection detector and used by the fault injection detector's logic to differentiate between a fault and a non-fault. Typically, a fault injection detector strives to detect differences between expected and actual reality, and each time such a difference is detected, a "fault" alert is provided.

Since different types of fault injection detectors are implemented using different mechanisms, various sensitivity control mechanisms may be employed to implement the sensitivity level, such as but not limited to the following:

a. a fault injection detector may identify sudden changes, aka glitches in the power supply voltage or the ground level in a chip. In such cases, the detector could be set to identify an abnormal condition when actual reality (the voltage actually detected) is, say, 50 mV, 100 mV or 300 mV away from an expected voltage.

b. a comparison of voltage levels may be conducted between different locations on the same logical network to detect local differences, since the expected reality is that all locations would be in the same state.

c. a light detector may be operative for attempting to identify fault injection using light energy, yielding fault injection detection based on voltage levels which correspond to the intensity of light.

It is appreciated that it is possible to compare voltage levels of digital signals which are supposed to be in the same logic state, whether 1 or 0, at any given time. In such a comparison, the triggering voltage difference as may be defined as X, Y or Z.

Also, the sensitivity need not be voltage level-based at all. Detectors with non-voltage-based sensitivity levels may for example include:

1—A detector designed to directly detect light, say laser, energy. If the detector converts light energy into voltage level proportional to the energy of light absorbed, it is possible to detect voltage levels A, B or C corresponding to light energy levels X, Y and Z respectively.

2—A detector designed to directly detect electromagnetic energy other than light. If the detector converts electromagnetic energy into voltage level proportional to the electromagnetic energy absorbed, it is possible to detect voltage levels A, B or C corresponding to electromagnetic energy levels X, Y and Z respectively.

An example of a detector with non-voltage-based sensitivity levels that does not operate in real time is a frequency deviation detector which may have plural sensitivity levels in terms of the magnitude of frequency deviation from the expected frequency. It is appreciated that the target of the fault injection may in this case comprise a chip clock which typically has a predetermined frequency (aka "expected frequency"). If, for example, the clock of a given chip has an expected frequency of 250 MHz, and a momentary deviation from that value, e.g. two clock pulses which are closer together than expected, is detected, this may be indicative of an attempt at fault injection.

Some glitch detectors may be designed with plural sensitivity levels which are selected through configuration and are predefined per a system architecture decision and pre-configured (as opposed to being configured dynamically as in embodiments of the present invention).

FIG. 2 describes a method for building a system which may receive from a processor core or CPU, an opcode indicator, makes a sensitivity level decision accordingly in real time, although optionally other factors may affect this decision as well, and then provides sensitivity level control to a countermeasure circuit, all in accordance with embodiments of the present invention.

As described, there may be situations or conditions, such as but not limited to execution of a conditional branch, which a security developer may believe introduces higher risk of hardware fault injection.

Typically, a fault is injected which eventually translates into an electrical event for the IC, and that event has the effect of disturbing the consistent and coherent operation of the IC's hardware. For example, in the case of MCU/CPU executing code, fault injection striving to disturb consistent and coherent operation of the IC's hardware would typically attempt to disturb the execution flow of the code, attacking the IC's hardware to disturb the execution of the IC's software and/or firmware.

In such cases, the security developer may want to dynamically apply a different tradeoff between security level and false alarms.

Any suitable procedure may be followed by a security developer as he goes about configuring the logic. For example, the designer may first simulate and/or operate the device across a full range of anticipated normal real-life scenarios and allowed operating conditions, to ensure that under allowed operating conditions the mechanism never (or only with acceptable rarity) triggers a false alarm. Then, the designer may operate the device, given fault injection the device is intended to withstand, and determine a fault injection detection level which triggers all or almost all fault injections properly e.g. at an accepted level of reliability. The designer can then define this "proper level" as the default detection level for detecting fault injections. The designer can then adapt the logic such that a selected higher sensitivity level (corresponding to a slightly more aggressive detection) is enabled in real time responsive to an output indication that the CPU is about to execute an instruction deemed by the designer as being associated with higher fault attack risk.

Typically, detection levels are adapted by the developer to be such that they are triggered (detect an attack) when operating conditions are indeed likely to cause the hardware to operate incorrectly. Such levels may be characterized by the developer on plural device variants to ensure little or no detection of fault injection during normal operation.

Typically it is desired to provide a circuit capable of detecting at more than one designer-defined levels e.g. at least two detection levels where one of the two levels, but not the other, intercepts mild fault injections at the risk of unnecessarily disturbing the regular operation of the device. The levels may include:
  a. a first level which detects an aggressive fault injection which causes an abnormal condition (e.g. a condition which generates a risk of device malfunction); and
  b. a second level which detects not only the aggressive fault injections, but also non-aggressive (aka mild) fault injections, which cause a condition which, while unexpected, can be sustained by the device without malfunction.

Still referring to FIG. 2, typically, a processor is provided which produces signals indicating which instruction/opcode, or family/group of opcodes, is about to be executed at each given moment. For example, the signals may indicate that a given instruction is about to be executed by the processor, from the time the processor's decode unit identifies the subject instruction/command and until the time the execution unit indicates that the execution of the instruction/command is complete. In this embodiment, the indication encompasses both the "decode" and "execution" phases of the given instruction, however this need not be the case. Alternatively, the signals may indicate that a given instruction is about to be executed during the "execution" phase, but not during the decode phase, of the given instruction. Another possible embodiment is to keep the indication active from (and including) the "decode" phase of the subject instruction I and until (but not including) the "decode" phase of the instruction I+1 (the instruction which is performed by the processor just after the processor performs instruction I).

It is appreciated that certain control signals aka CPU-internal signals governing the above cycle are part of the CPU's internal design and nonetheless are common to all or many CPUs. For example,
  a. signals telling the Fetch unit to get the instruction from memory and store the instruction somewhere local, and
  b. signals, produced by the Decode unit, which command or tell other CPU units to operate and execute the instruction.

Also, as still shown in FIG. 2, the system designer typically associates at least one opcode or group of opcodes, with an associated security risk. Typically, conditional branch opcodes are associated with a high risk R (R may be a scalar) relative to some or all opcodes other than conditional branch opcodes which are associated with a risk lower than R. This is because conditional branch instructions control the flow of the program and are therefore points where fault injection could divert the program from the correct and orderly flow.

Alternatively or in addition, according to certain embodiments, a detailed risk analysis may be used to gain an understanding of the relative risk associated with various different opcodes.

To conduct risk analysis, a designer may study the processor's instruction set. An example description of an instruction set (of the ARM Cortex-M0) is available on the web, at the following http link, with an html suffix:
  infocenter.arm.com/help/index.jsp?topic=/
    com.arm.doc.ddi0432c/CHDCICDF.

At least, to a certain extent, such analysis may be generalizable between processors, since instruction sets tend to be similar between processors, at least between similar types of processors, such as between RISC processors or between CISC processors. For example, many processors may have all or most of the following types or groups of instructions:
  1. Memory and register handling—commonly including load, store and move instructions.
  2. Arithmetic and logic manipulations—commonly including add, subtract, sometimes multiply and divide or arithmetic shifts, and logical operations such as Or, And, Xor.
  3. Stack management—typically push/pop.
  4. Branch—conditional and non-conditional.
  5. Control—such as but perhaps not limited to state management, interrupt management.

Nonetheless, at last some per-processor risk analysis may be conducted since each specific processor does tend to have an at least somewhat different instruction set than other processors.

The designer may also review the application and how it is implemented (including analysis of the application's code) and may quantify risk of specific instructions or types of instructions, accordingly. For example:
  a. A stack management instruction may be deemed high-risk relative to at least one instruction other than stack management instruction (and/or relative to the risk level associated with at least one instruction in at least one of the instruction groups 3-5 above and/or relative to op-codes deemed as low risk) e.g. because stacks may also have a role in program flow, specifically when subroutine calls are involved; stacks typically keep return addresses, so manipulating them through fault injection may also divert programs from the orderly execution flow.

b. In the Arithmetic/Logic group (group 2 above), based on analysis of the code, a system designer may find that specific arithmetic instructions are used in "critical" places in the code which affect program flow and/or code "decision making". Those specific instructions could be associated with a high risk e.g. a risk that is higher than arithmetic instructions in the code which are not in such critical places or higher than the risk level associated with at least one instruction in at least one of the instruction groups 3-5 above and/or higher than op-codes deemed as low risk.

Also, and still as shown in FIG. 2, there is a fault injection detector with L=at least two sensitivity levels—one which is more tolerant (has a lower sensitivity level) and another which is more sensitive (has a higher sensitivity level).

Figure 5:
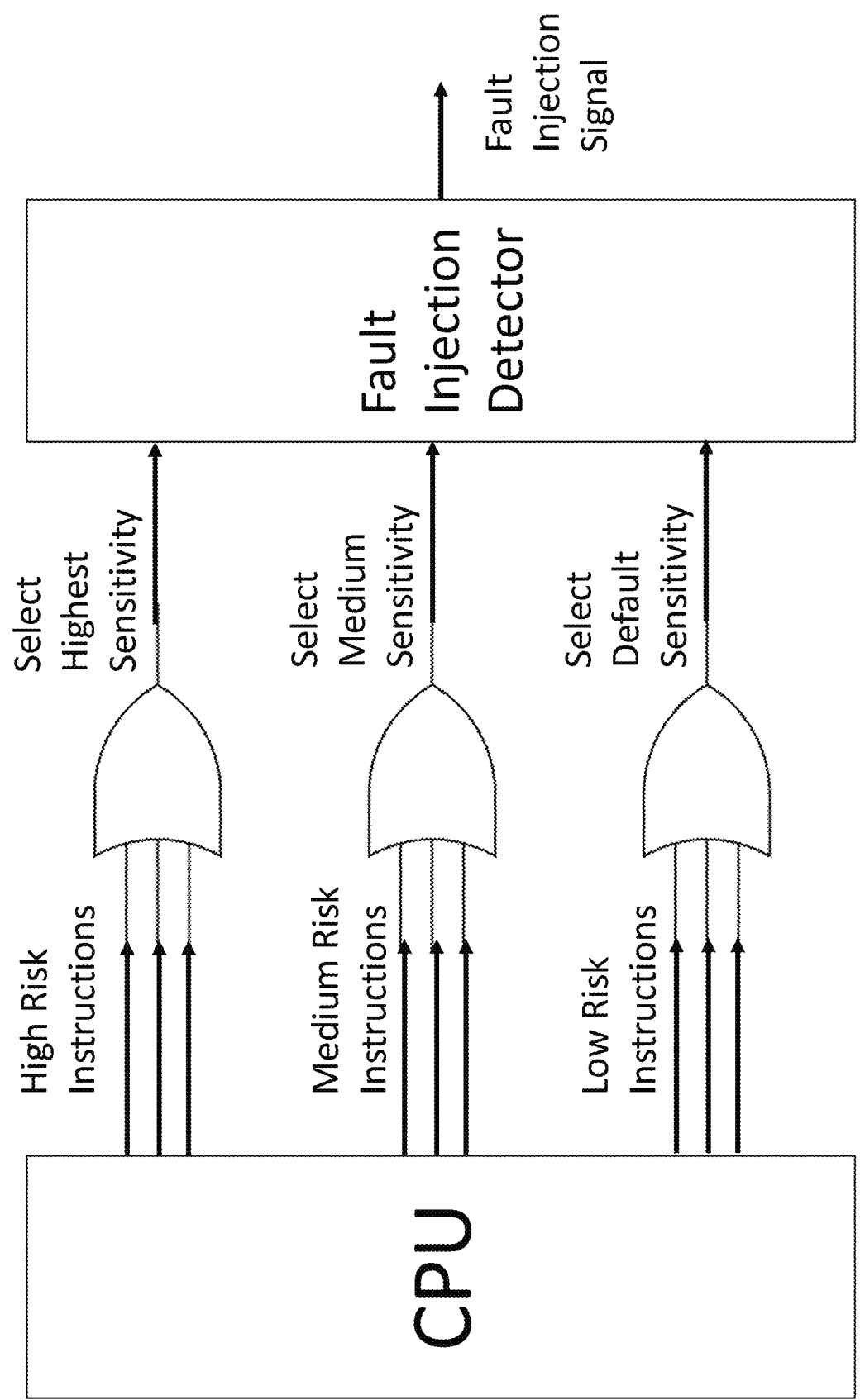
FIG. 5 is a diagram of an example dynamic sensitivity-level adjustment system showing 3-level sensitivity including a lowest sensitivity level which is defined as the default level, and two additional levels, both higher than the default level, all in accordance with certain embodiments.

Also, and still as shown in FIG. 2, dynamic sensitivity-level adjustment (e.g. selection of one of the L levels in real time) may be implemented in any suitable manner. For example, decode logic may be provided which receives those signals from the processor, and according to the security risk rating of the opcodes, produces corresponding signals to indicate to the fault injection detector at any time whether it should trigger, based on the tolerant or the more sensitive detection level. An example implementation, showing 3-level sensitivity including a lowest sensitivity level which is defined as the default level, and two additional levels both higher than the default level, is shown in FIG. 5.

According to certain embodiments, the indication to the detector goes off right after or immediately upon decoding the instruction such that the detector gets a signal before execution of that instruction by the core starts. Detection circuits typically do not, themselves, "reject" or absorb or otherwise handle the fault injection. However, the circuits do raise a flag to indicate that a fault injection came in, allowing other modules to respond in any suitable manner, such as but not limited to reverting the device (e.g. CPU or processor) to a known state and the program to a known point in the flow. Such reverting may occur relatively slowly e.g. only after the fault injection has occurred, however, this is acceptable since damage from a fault injection occurs not immediately, but rather only when a place in the code is reached, that should not have been reached, and indeed would not have been reached were it not for the fault injection. Reverting occurs before this place in the code is reached.

The method of FIG. 2 typically comprises some or all of the following operations, suitably ordered e.g. as follows:

Operation 1. provide processor core/CPU which is vulnerable to fault injection and which produces signals indicating which instruction/opcode, or family/group of opcodes, is executed at any given moment.

Operation 2. risk analysis: system designer associates security risk e.g. risk of fault injection to a list of opcodes or groups of opcodes and generates sensitivity level decision/selection logic accordingly. For example: conditional branch opcodes—high risk; all other opcodes—low risk.

Operation 3. provide fault injection detector with at least two sensitivity levels.

Operation 4. implement sensitivity-level adjustment of CM circuit e.g. provide a CM circuit whose sensitivity level is adjustable in real time, say by dynamic selection of one of the at least two levels. Typically, the fault injection detector supports dynamic e.g. real-time adjustment of sensitivity levels which operates in real time and has a response time which is shorter than the decode-execution cycle of a single instruction by the processor or CPU being secured by the fault injection detector.

The response time is typically shorter, as above, because it is typically desired that the time period during which the control signals propagate through the sensitivity control unit to the detector leave enough time for the detector to react. For example: if the instruction cycle is 40 ns long, then the time which elapses from the indication of the opcode and until the detector is set at the required sensitivity level is, say, up to 10 ns, leaving a 30 ns time window in which the detector may react.

Turning now to FIG. 3, it is appreciated that conditional execution and conditional branches, i.e. software decision points, are regarded as weak points in security code i.e. points which are prone to fault injection attacks. FIG. 3 is a simplified block diagram illustration of a security system according to certain embodiments, which may for example be provided in accordance with the method of FIG. 2. The system of FIG. 3 typically comprises:

A processor core or CPU having op-code or other code indications, indicating the execution of specific instructions or categories of instructions, such as but not limited to conditional branch, specific comparisons, etc.; and A CM circuit e.g. an electrical countermeasure circuit including a fault injection detector designed with multiple, controllable sensitivity levels. The circuit may comprise fault injection amelioration circuitry in conjunction with the fault injection detector having adjustable sensitivity. The fault injection amelioration circuitry is actuated if the fault injection detector detects a fault injection e.g. is triggered each time the fault injection detector detects a fault injection.

Design issues regarding certain examples of such circuitry are described for example in the following white papers, both available on the web:

Compilation of a Countermeasure Against Instruction-Skip Fault Attacks

Thierno Barry, Damien Courouss_e, Bruno Robisson and:

Low-Cost Software Countermeasures Against Fault Attacks: Implementation and Performances Trade Offs.

It is appreciated that the term "countermeasure" is used generally to refer to detectors and/or modules for ameliorating (e.g. preventing or rectifying) ill-effects of fault injection attacks. In the context of FIG. 3, the CM circuit detects such attacks and triggers any suitable module for preventing or rectifying ill-effects of such attacks.

According to one embodiment, the security system, having identified the execution of a conditional branch, will adjust the detection level of the respective circuit to be more sensitive.

It is appreciated that various instructions or categories thereof may be considered to introduce a higher risk of fault injection than instructions which are not so considered. To give some non-limiting examples, any or all of the following op-codes may be deemed to introduce a higher risk of fault injection (which may result in a system design decision to associate any or all of the following opcodes with a high security risk (highly at risk for fault injection e.g.) i.e. a risk level which is higher than that associated with opcodes other than the following, and/or to provide logic which increases the sensitivity level of the fault injection detector when such instructions are encountered):

a. Opcodes indicative of a conditional branch, for example, branch-if-equal, branch-if-not-equal are RISC CPU branch instructions based on a comparison between two operands which precede the conditional branch and produce "results" used subsequently by the conditional branch to decide whether to branch or continue sequentially.

b. Opcodes performing comparisons or other "tests", which result in setting various flags, which are then used by logic which "decides" whether to take a given conditional branch or not.

For example, a compare instruction may be operative for comparing two operands and setting a flag in the event that the two are equal (or in the event that the two are not equal). A subtract operation may set a flag in the event that the result is negative or nonzero, to compare operands, e.g. numbers.

c. Opcodes pushing specific types of information into the processors stack, e.g. return address of critical or sensitive information or data or CPU subsystem flags later used for conditional operations.

d. Opcodes which are characterized to be used as implementing the stop conditions of loops. For example, loops are described in the document available at the following https www link, which has an htm suffix: tutorialspoint.com/assembly_programming/assembly-_loops.

The "loop" instruction as described assumes that the loop counter is kept in a predefined CPU register. When the CPU encounters a "loop" instruction, the CPU may decrement the loop counter, compare the loop counter to zero, and return to the beginning of the loop if the counter is greater than or equal to zero, thereby to implement a loop stop condition.

In some cases, it may not be known in advance which instructions are used e.g. because instructions used may depend on CPU-specific compiler choices. For example, a CPU may have a built-in instruction made for looping, which deals with a designated register or variable, automatically increases and decreases that register or variable, and then jumps back to the beginning of the loop if the loop counter so stipulates, or lets the program continue sequentially if the loop counter has elapsed.

It is appreciated that various instructions or categories thereof may be considered to introduce a particularly low risk of fault injection, relative to instructions which are not so considered. To give some non-limiting examples, any or all of the following may be considered to introduce a particularly low risk of fault injection (which may result in a system design decision to associate any or all of the following opcodes with a low security risk i.e. a risk level which is lower than that associated with opcodes other than the following, and/or to provide logic which reduces the sensitivity level of the fault injection detector when such instructions are encountered, thereby to cut down on false positives with little or no adverse effect):

a. Load opcodes which just read data from memory or
b. Store opcodes which just store data in memory While fault injection might cause the above to malfunction, it may be regarded as practically impossible for a hacker to define an effective attack based on disturbing specific store/load instructions.

FIG. 4 is an example method of operation in accordance with certain embodiments; e.g. of a system provided in accordance with the method of FIG. 2 and/or the system of FIG. 3.

The method of FIG. 4 is typically operative in conjunction with a core executing instructions, where indications are provided and decoded and used to select, in real time, a sensitivity level for a fault injection detector. Typically, a given sensitivity level is associated with each of plural instructions or groups/sets of instructions. Typically, the designer of the system associates higher sensitivity levels with instructions deemed, according to the designer's risk assessment, to suffer from higher risk level/s e.g. deemed to be attractive targets from the viewpoint of a hacker seeking a suitable target location for a fault injection attack, and conversely, lower sensitivity levels with instructions deemed to suffer from lower risk level/s. The system using the method of FIG. 4 is typically structured such that instructions are decoded and responsive, in real time. Instructions are set to sensitivity levels associated with or corresponding to instructions just decoded, and about to executed. Typically, then, sensitivity levels are set in the time window between decoding of an instruction and execution thereof by the core.

The method of FIG. 4 typically includes some or all of the following operations, suitably ordered e.g. as shown:

310. CPU provides opcode indicator I to sensitivity level decision logic (aka sensitivity level selection logic) employed by sensitivity level control module.

320; sensitivity level decision logic generates a decision: CM circuit's sensitivity level should be L_I 330. sensitivity level control module signals (or commands) sensitivity level control module to adjust CM circuit's sensitivity level to L_I 340: responsively, sensitivity level control module issues a sensitivity level control signal to the CM circuit 350: CM circuit adjusts its sensitivity level to L_I. The level may, for example, be adjusted using a suitable selector element whose controls comprise, or are derived from, the sensitivity level control command which are indicative of which opcode is about to be executed.

Figure 6:
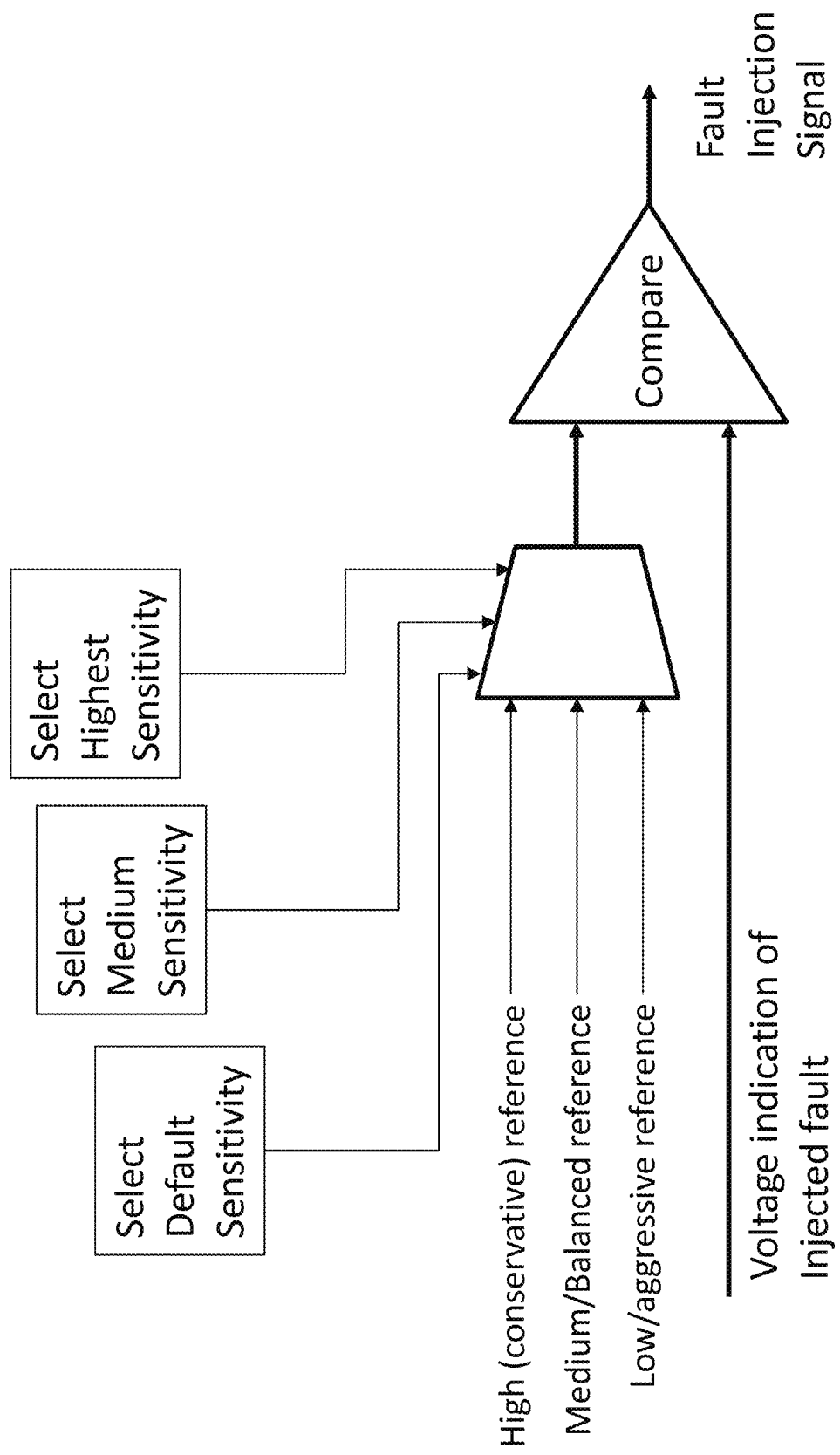
FIG. 6 is an example implementation of the fault detector of FIG. 5.

FIGS. 5-6 are 3-level examples of a dynamic sensitivity-level adjustment system according to certain embodiments. The design of the device is analyzed in advance, including risk categorization, and then, during operation, the detector responds in real time based on a priori risk categorization.

Specifically, FIG. 5 is a diagram of an example dynamic sensitivity-level adjustment system showing 3-level sensitivity, including a lowest sensitivity level which is defined as the default level, and two additional levels, both higher than the default level. FIG. 6 is an example implementation of the fault detector of FIG. 5.

Figure 7:
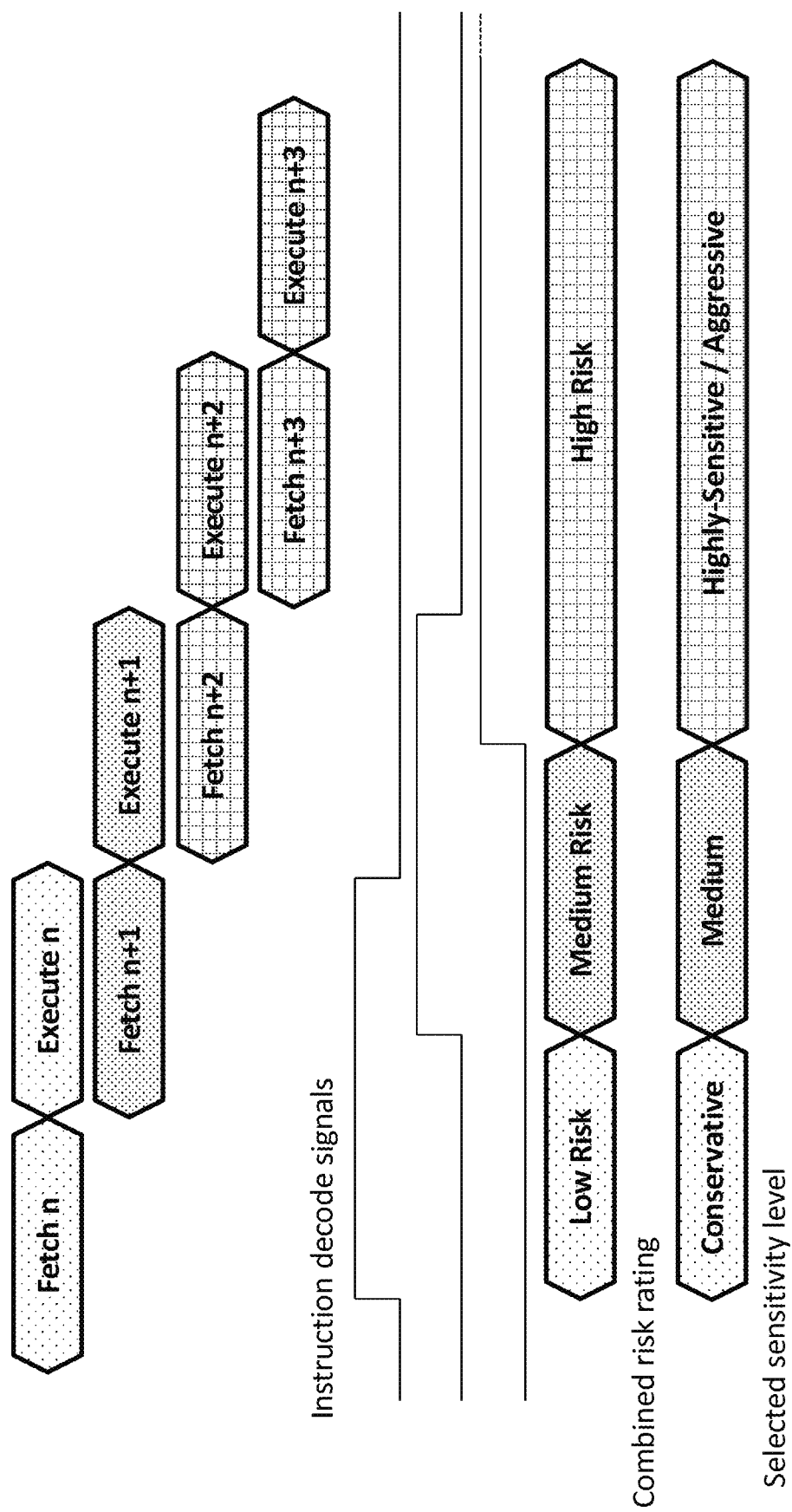
FIG. 7 is an example 3-level waveform diagram showing instruction decode signals, combined risk rating (e.g. low, medium or high) and selected sensitivity level (e.g. conservative, medium or aggressive/highly sensitive); it is appreciated that any number of levels other than three may alternatively be employed.

FIG. 7 is an example 3-level waveform diagram showing instruction decode signals, combined risk rating (e.g. low, medium or high) and selected sensitivity level (e.g. conservative, medium or aggressive/highly sensitive); it is appreciated that any number of levels other than three may alternatively be employed, and there need not be a default level as shown.

In the example execution pipeline for the CPU, as shown, if the pipeline is processing, say, one "low-risk" instruction and one "high-risk" instruction, the high-risk instruction, once decoded, takes priority in setting the sensitivity level of the detector. For example, at the point where the "medium-risk" fetch comes in, the sensitivity increases as soon as (just after) the instruction is decoded. Similarly, when the "high-risk" fetch comes in, as soon as the instruction is decoded, the sensitivity immediately increases yet further. More generally, when the system of FIG. 7 recognizes an instruction which is of higher risk than the current setting, the newly decoded (higher) risk takes priority until the CPU finishes processing the high-risk instruction, then reverts back to the instruction previously handled.

It is appreciated that "fetch" e.g. in FIG. 7 includes "decode", for brevity, hence "fetch" in the diagram may be interpreted as "fetch and decode".

Figure 8:
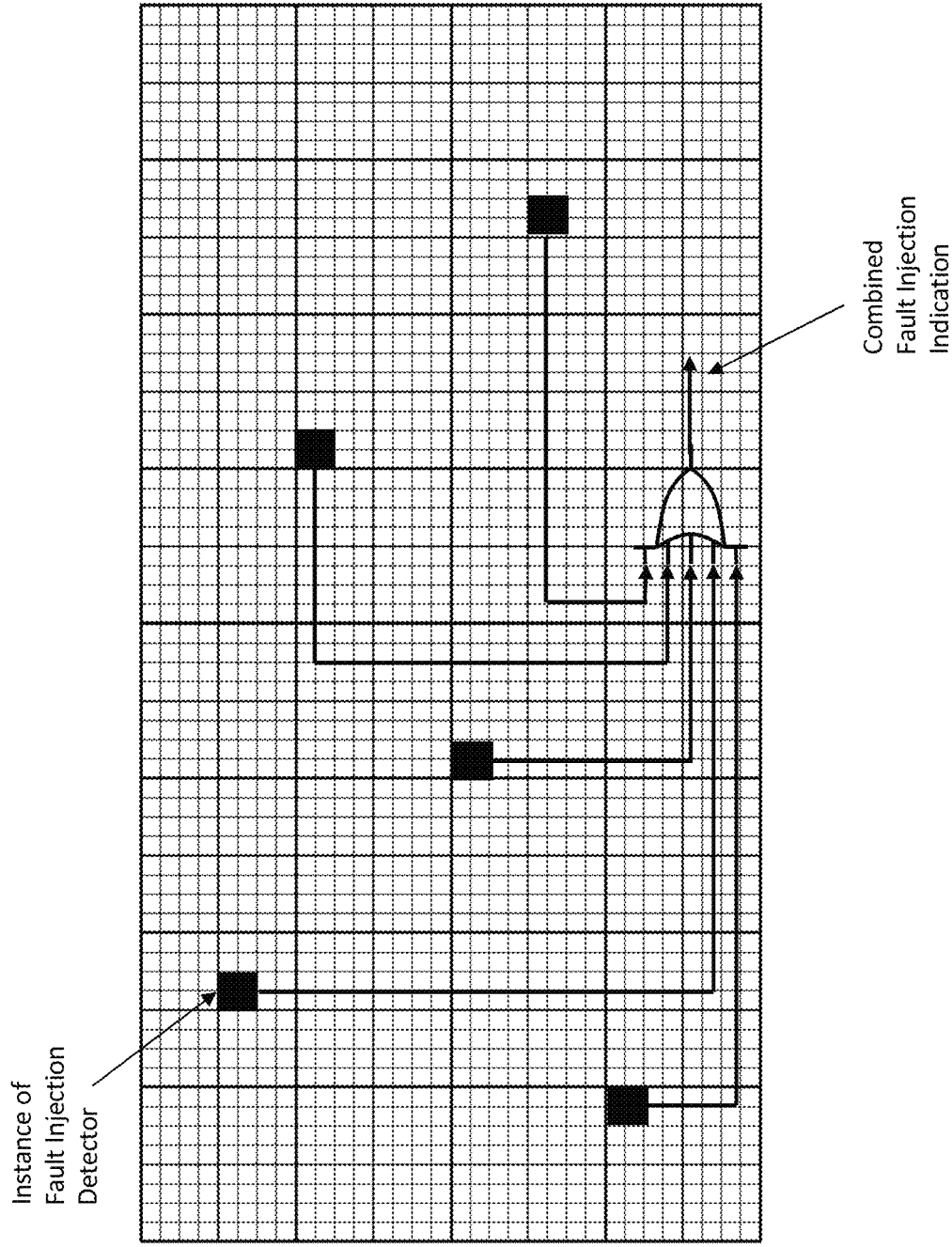
FIG. 8 is a simplified diagram of a plural detector unit embodiment of the present invention.

Reference is now made to FIG. 8. According to certain embodiments, the fault injection detector comprises plural fault injection detector units deployed in plural processor core locations respectively, e.g. as shown in the example of FIG. 8, thereby to detect fault injection attacks at all of the plural locations while taking into account the locality-dependent nature of certain conventional fault injection detectors. The fault injection detector may alert (and/or may trigger fault injection amelioration operation/s applied to location L) if at least one of the detector units, deployed at location L, detects a fault injection attack at location L. Thus an OR function (or any other suitable logical function) may be used to combine fault injection detection determinations made by individual ones of the plural units. Any suitable number of units may be provided, with any suitable distance between them, typically determined as a function of, inter alia, at least one of the following factors: IC die area occupied by each of the units, physical characteristics of the IC circuit being protected, and spatial characteristics of anticipated fault injection attacks.

FIG. 8 is a simplified diagram of plural fault injection detector units deployed at various processor core locations and occupying plural IC die areas respectively, according to certain embodiments of the invention.

Use cases, for certain embodiments of the present invention, abound.

For example, co-owned U.S. Pat. No. 9,523,736, describes detecting a difference in state between different branches of a given electrical network. An electrical logical network in an IC is typically expected to be in the same state e.g. logic state of either 1 or 0, through all branches. Therefore, when a difference in voltage level is detected between two physical points on the same logical (electrical) network, it is likely to indicate an attempt of fault injection causing a local change. A designer may decide that a difference between that locality and other places of, say, 50 mV between two points, is normal, as opposed to a difference of 300 mV which is sufficiently abnormal as to risk IC functionality, and a 200 mV difference which, although abnormal, is not deemed risky. According to certain embodiments, rather than merely designing a detector targeting 300 mV, the detector may, by virtue of control, as described herein, detect either a difference of 200 mV or a difference of 300 mV, depending on a varying level of sensitivity e.g. in real time, set control signals may be sent to the detector to set the detector either to the 200 mV sensitivity level, or to the 300 mV level. Thus, the system in real time determines whether to consider 50 mV or 200 mV or 300 mV as a difference, where positive detection of a difference indicates that a fault injection has been detected.

It is appreciated that there may be other use-cases other than, or more general than, fault injection risk, that would justify adjustment of sensitivity level in real time. For example, hackers are believed to study and characterize the sensitivity of a given device they are targeting, to fault injection. This might precede focused attempts on the part of the hacker to inject faults at very specific times and/or at specific device locations. Changing sensitivity level in real-time, randomly or in accordance with risk detected in real time e.g. by associating specific instructions with specific levels of risk, as described herein, may confuse or disturb such study.

Alternatively or in addition, the sensitivity level could be increased if, in real time, during a certain period of operation, the device detects a large (over-threshold) number of fault injection attempts e.g. more than X detections over a Y period of time. For example, out of 100% of system operation time, there may be periods of lower security risk, such as but not limited to periods which, empirically, have been observed to be less popular for hacking, and there may be periods of higher security risk such as but not limited to periods which, empirically, have been observed to be more popular for hacking.

Time-stamped events of detected fault injections may be recorded, after which suitable code may keep track of fault injections over time and identify outlying periods of time with particularly high or with particularly low fault injection incidence.

It is appreciated that the fault detector herein may be integrated into larger systems, thereby improving their operation.

For example, it is appreciated that the embodiments shown and described herein need not serve as the only line of defense making conditional branch operations more difficult to hack. On the contrary, the fault detector herein may be usefully combined with conventional anti-hacking techniques for combatting vulnerability to fault injections, at the code level, for example:

a. by preventing or impeding or reducing occurrence or incidence of fault injection and/or
b. by evading or ameliorating the impact of fault injection, once it occurs, either of which may be triggered by the fault injection detection technologies shown and described herein.

Any method shown and described herein for detecting a fault injection may be employed, and may augment or replace a legacy fault injection detection technology used in a legacy system which includes a module operative for evading or ameliorating the impact of fault injection, once detected. For example, the module may be activated when triggered by either of two or several fault injection detectors.

Typically, category b requires the fault injections to be detected. Therefore, any anti-hacking measure in category b may be improved upon by using the improved, dynamically controlled fault injection detection method shown and described herein.

Once a fault injection has been detected, e.g. as shown and described herein, any suitable fault injection impact amelioration operation may be triggered thereby and may be performed responsively, to ameliorate e.g. rectify at least one impact e.g. ill-effect of fault injection, such as but not limited to modules adapted for:

a. Putting the device in an irreversible state, preventing any further options
b. Causing the processor to jump to a designated routine which, say, performs an overall integrity check and then, typically, resets or re-initiates the CPU.
c. Putting the processor in an endless loop until being reset by a watchdog timer.
d. Halting the device until a certain amount of time has elapsed.
e. Raising the sensitivity level for a certain amount of time after which the sensitivity reverts to default in case of no further detection.
f. Disabling specific predesignated "risky" functions for a certain duration of time. Risky functions may be approval of authentication, disclosure of sensitive data, disclosure of crypto key.
g. Halting the system until, say, a power cycle is applied or until system or device hardware is reset; watchdog timer reset or any other stopping criterion or mechanism for releasing a stuck CPU.

It is appreciated that the above fault injection amelioration operations are merely exemplary of the functionalities that may be provided for modules designed to ameliorate ill-effects of fault injection attacks. Amelioration operations or functionalities may include preventing or impeding or reducing occurrence or incidence of fault injection and/or evading or ameliorating the impact of fault injection, once it occurs. It is appreciated that amelioration operation/s may be implemented in hardware and/or in software and may utilize the program/data memory of the processor core.

It is appreciated that more than one such fault injection amelioration operation may be performed. For example, perhaps operation e above would be combined with one of operations a-d or f-g.

Implementing A Sequence Of Conditional Branches: For example, one technique among many such, for making fault injection more difficult, hence less likely e.g. as per category a above, is to repeat the conditional branch n>1 times, e.g. twice (n=2) in which case the first branch jumps to a second branch which is the one which jumps to the final destination, both branches in the n=2, or more generally all n branches, being based on the same condition. This addresses vulnerability because here, for the branch to be hacked, a single fault would not suffice, and instead, a fault would need to be injected at each of two or more generally n points, which increases the level of complexity of hacking the subject execution flow. It is appreciated that the embodiments shown and described herein may, if desired by a system designer, be combined with other anti-hacking measures (e.g. any suitable measures to ameliorate e.g. rectify at least one impact e.g. ill-effect of fault injection) thereby, together, making conditional branch operations even more difficult to hack. The above technique of Implementing A Sequence Of Conditional Branches thereby to impede fault injection by making fault injection more difficult, hence less likely, may for example be combined with any suitable technique for ameliorating the impact or ill-effects of fault injection, a technique which may, for example, include detecting fault injections using any of the embodiments shown and described herein, and then, if and when a fault injection is detected, implementing any suitable fault injection impact amelioration measure.

One known technique for better detecting fault injections (and hence better ameliorating the effect thereof e.g. by halting the system until, say, a power cycle is applied) is described in co-owned U.S. Pat. No. 9,523,736, which describes an apparatus for detecting fault injection which includes a high-fanout network which spans an Integrated Circuit (IC), and circuitry. The high-fanout network may be continuously inactive during functional operation of the IC, and the circuitry may be configured to sense signal levels at multiple sampling points in the high-fanout network, and to identify a fault injection attempt by detecting, based on the sensed signal levels, a signal abnormality in the high-fanout network. The circuitry may be configured to sense signal levels at multiple sampling points in the high-fanout network, to distinguish, based on the sensed signal levels, between legitimate signal variations and signal abnormalities in the high-fanout network during functional operation of the IC, and to identify a fault injection attempt by detecting a signal abnormality. The circuitry may be configured to modify one or more of the signal levels in the high-fanout network, in response to identifying the fault injection attempt. A control unit or sensor 48 may modify the signal level on network root 40 or on another branch of the high-fanout network (e.g., force the signal to be active) due to assertion of an ALERT signal.

Another example is detection of hardware glitches e.g. glitches to power/ground in an IC induced by an external e.g. electromagnetic source of energy. Fault injection via power glitches is a known method for hacking IC devices. Electromagnetic (EM) glitches have for years been considered an effective fault injection technique for achieving physical attacks against ICs. Circuits for detection of hardware glitches which are indicative of fault injection vulnerability and which "suffer from" a tradeoff between security level and false alarms, aka false positives, include, for example, those available by Internet at the following http locations:
  ieeexplore.ieee.org/document/5376828;
  Zussa, L, et al, "Efficiency of a glitch detector against electromagnetic fault injection" ieeexplore.ieee.org/document/6800417/
  and at the following https www location:
  blackhat.com/docs/eu-15/materials/eu-15-Giller-Implementing-Electrical-Glitching-Attacks.pdf.

State of the art knowledge regarding fault injection attack detectors is described in "Cheap & Cheerful: A Low Low-Cost Digital Sensor for Detecting laser fault injection attacks", dated 16 Dec. 2016, and available via Internet at the following http location: www-users.math.umn.edu/-math-sa-sara0050/space16/slides/space2016121602-37.pdf. The proposed solution is tunable ("This sensor has bi-directional detection capability with tunable sensitivity at back-end stage"). As indicated elsewhere as well, the disclosure of this document, and indeed all documents referenced herein, is hereby incorporated by reference.

It is appreciated that the above detectors may be improved by using embodiments herein to add opcode-responsive dynamic sensitivity level adjustment. The CPU design in the above "cheap and cheerful" disclosure, being tunable, may be adapted to provide output signals indicating the instruction about to be executed at any time. For example, multiple tunings selectable at real time may be embedded in the design, or plural circuits may be added, each with different tuning, where only one output of only one of the plural circuits is selected in real time, depending on the sensitivity level indicated by the decision logic shown and described herein.

Generally, any of the fault injection attack countermeasures known in the art are for example described in the following:
  Compilation of a Countermeasure Against Instruction—Skip Fault Attacks" by Thierno Barry, Damien Courousse, Bruno Robisson, available via Internet at the following https location: hal-cea.archives-ouvertes.fr/cea-01296572/document; and
  "Low-Cost Software Countermeasures Against Fault Attacks: Implementation and Performances Trade Offs" available via Internet at the following http location: euler.ecs.umass.edu/research/bpbk-WESS-2010.pdf may co-exist with embodiments of the present invention, as complementary detection/protection layers. These together enhance the total degree of protection of a CPU or similar device, from attacks e.g. fault injection attacks.

It is appreciated that analog circuits are often designed with tuning options e.g. with multiple detection levels/thresholds providing multiple sensitivity levels because it may be difficult to predict in advance which levels/thresholds will work best in the environment of a real electrical system. Once in silicon, conventionally, testing is performed to determine which configuration works best, and then the circuit may be configured to the one specific "optimal" or best workable setting according to certain embodiments, rather than configuring to a single testing-selected setting. Instead, all, or more than one, of the plural settings are retained, and control circuitry is added to select, in real time, which of the plural settings to use as shown and described herein. Testing may then be conducted simply to reconfirm the performance of the circuit in real silicon.

A particular advantage of the embodiments shown and described herein is the advantage of making the tradeoff between the fault injection detection's security level and false-positive level highly adjustable, even at the granularity of a single opcode. This allows the tradeoff to be overcome to no small extent, by restricting necessary but regrettable high tolerance of false-positives (or of low security level) only to those opcodes which require such high tolerance, and desirably lowering the tolerance of false positives (or of low security level) for all opcodes which do not require such high tolerance.

It is appreciated that the particular embodiments herein are not intended to be limiting. The invention is intended to include for example any embodiments operative in conjunction with CPUs or processors which have, on the inside, signals which are the result of decoding of instructions about to be executed. According to these embodiments, these signals are sent out of the CPU, thereby to allow at least one operative unit outside the CPU to act based on these signal's states, thereby to utilize signals available in one context and designed for CPU-internal purposes for another, typically CPU-external purpose in a typically CPU-external location or context. For example, responsive to real time indication/s of which op-code/instruction is about to be executed, a sensitivity level control module in the security system may adjust, on the fly e.g. in real time, the sensitivity level (aka security level) of fault injection detector functionality in countermeasure circuitry operative to counter fault injection attacks.

Firmware, if used to implement certain embodiments herein, may be held in nonvolatile memory, e.g. Flash or ROM. Any suitable technology may be used to prevent limitations of the location of the firmware from interfering with flash management.

Alternatively, certain embodiments described herein may be implemented partly or exclusively (i.e. without firmware) in hardware in which case some or all of the variables, parameters, sequential operations and computations described herein may be in hardware.

As used herein, the term "Countermeasures" or CM is intended to include any aspect of operation of circuitry on a chip, which typically can react to control signals in real time and therefore are, typically, hardware-implemented, which protects the CPU and/or any other operational function or block in the chip from fault injection attacks such as but not limited to power glitch attacks, clock glitch attacks, and signal glitch attacks.

Some countermeasures are "evasive", because they confuse the enemy or attacker as to when and where to inject the fault; it is appreciated that if the attacker injects the fault in the "wrong" (from the attack's point of view) place or time, the attack is much less likely to cause its intended effect.

For example, this article https://www.nuvoton.com/support/technical-support/technical-articles/TSNuvotonTech-Blog-000154/presents "random delays and random variations in the order of running processes", both of which yield unpredictable system execution timing, as countermeasures against fault injection attacks, explaining that "making it impossible for hackers to understand the timing of the inner system working would be an effective countermeasure for a fault injection attack. The simple way is to establish unpredictable system execution timing that makes it difficult for attackers to find the right time point for attack. Unpredictable system timing could also be used to avoid hackers to seek the critical time point of the security operation. For implementing unpredictable system timing, it can be achieved through random delays and random variations in the order of running processes."

The term CM or countermeasure is used herein to include any mechanism, circuits, detectors, or other hardware or firmware or software which is operative to detect and/or to respond to an attack e.g. by countering or taking an action to counteract whatever danger or threat was, or will be, or may have been, or may soon be induced by the attack. A countermeasure may comprise a mechanism e.g. temperature sensor, or Glitch detector which is triggered by the attack (aka "trap" or "trapdoor") hence detects the attack; this mechanism may then also trigger suitable action, e.g. of defense or resolution.

A CM may include any hardware, firmware or even software which is triggered by an attack and/or which triggers action which defends the protected circuitry, whether entirely or partially, whether before or during the attack e.g. proactively or after the attack e.g. retroactively.

The term glitch herein is intended to include applying some extrinsic electric, magnetic, laser or other energy at a specific point in the IC, or at an IC IO terminal/pin, which disturbs chip functionality in various possible ways such as but not limited to causing a CPU to take a conditional branch that the CPU was not supposed to take, causing a logical state-machine to make a state change that the logical state-machine was not supposed to make, deliberately extrinsically changing the state of a register or memory bit, making certain chip logic produce temporarily an incorrect (from designer perspective) logic result]. The term glitch, as used in the art, is intended to include any transition that occurs on a signal. This may occur normally, before the signal settles to its intended value, particularly in a digital circuit. Typically the transition includes an electrical pulse of typically short duration, e.g. due to a race condition between plural signals which may be derived from a common source but may have different delays. Certain electronic components, e.g. flip-flops, need to be triggered by a pulse of at least a given length otherwise the flip-flops (say) do not function correctly. In this case, a pulse shorter than that minimum length is also considered a glitch. Glitches may also include a runt pulse, or pulse whose amplitude is smaller than a minimum level required for correct operation, and/or a spike, which may for example be caused by ringing or crosstalk. A glitch may, e.g. in a well-timed synchronous circuit, be harmless or well-tolerated, but more often constitutes an effect which results in a malfunction, hence is considered a fault or design error. The term glitch, as used herein, typically includes a transition that occurs on a signal and/or to a power/ground line and is introduced to an attacker, with the aim of either making an IC go out of order, and/or making the IC perform certain actions, or fail to perform certain actions, which, by their commission or omission respectively, yield an outcome desirable to the attacker, such as disclosing secret data, say social security number/s stored on the IC, to the attacker.

According to certain embodiments, a security system is configured for deployment on a chip which is to be protected, the security system comprising at least one fault injection detection subsystem configured for deployment on the chip, each the fault injection detection subsystem having plural sensitivity levels which are selectable in real time and comprising: at least one hardware fault injection detector circuit/s, configured for deployment on the chip, and, coupled thereto, sensitivity level control logic configured for deployment on the chip and operative, in real time, to transition the fault injection detection subsystem, from its current sensitivity level from among the plural selectable sensitivity levels, to a next sensitivity level from among the plural selectable sensitivity levels, by generating sensitivity control signals (aka sensitivity level selections) and feeding the sensitivity control signals to at least one hardware fault injection detector in the subsystem.

It is appreciated that any suitable mechanism may trigger state changes. Chip state transitions may occur automatically by hardware, e.g. upon detection of no activity, or may be activated by firmware.

It is appreciated that there may be one or more subsystems on the chip and each of those might include one or more hardware fault injection detectors, one or more sensitivity level control logic circuits, each of which may be coupled to or associated with one or more hardware fault injection detectors, and one or more functional modules, each of which may be associated with a different detector.

Any suitable implementation for the plural sensitivity levels may be employed. A voltage glitch detector with plural respective detection levels (e.g. as described/shown in detail herein) may be used, or a temperature sensor with plural respective temperature detection thresholds.

The term "glitch detector" is intended to include any circuitry which monitors a power supply line and triggers each time the power level drops to X % (or Y mV) below a nominal power level. Each time such drop is detected, this may be due to an attacker trying to maliciously manipulate the power supply of the chip to inject a fault.

A glitch detector may be triggered by (detecting) a glitch on whatever power or signal the glitch detector monitors. Similarly, a temperature sensor may be triggered when temperature of a certain area of the chip where the sensor is placed departs from a (typically predefined) "normal" temperature range. Other events which may happen when a CM is triggered include, for example, halting CPU execution and/or selectively resetting certain chip mechanisms and/or preventing access to certain memory areas and/or inhibiting the functionality of certain chip IO channels.

Another embodiment providing a countermeasure with plural sensitivity levels is that a given subsystem may include a multiplicity of detectors, various subsets of which may be active (say, a subset of only 25 from among 100 detectors may be active, or a second subset of only 50 of the detectors may be active, or a third subset of only 75 of the detectors may be active, thereby to yield plural (e.g. 3, in this instance) sensitivity levels of each subsystem at various different times.

More generally, the subsystem may comprise plural detectors and the sensitivity level of the subsystem at time t may be implemented as a number of detectors, from among the plural detectors, which are enabled at the time t and typically, the sensitivity control logic determines how many of the plural detectors are enabled at time t, thereby to provide a counter-measure with a real-time configurable sensitivity level such that lower sensitivity levels are implemented by smaller numbers of activated detector circuits, and higher sensitivity levels are implemented by larger numbers of activated detector circuits.

Multiple instances of hardware detector circuits which may detect fault injection attacks (e.g. glitch detectors, or temperature sensors, or other countermeasures) may be distributed, over at least a (typically predefined) portion of the chip to be protected, either spatially evenly, or using a predefined, deliberate placement which may depend inter alia upon location of the chip functional module and/or the security risk associated therewith.

Typically, the at least one fault injection subsystem also comprises at least one functional module/s configured for deployment on the chip which generate/s output signal/s in real time, and feeds the output signals to the sensitivity level control logic thereby to provide the sensitivity level control logic with indications as to the next sensitivity level to be selected from among the plural selectable sensitivity levels.

Each functional module may for example include:
a cryptographic accelerator; and/or
a communications functional module such as UART, 12C, USB controller or any (typically hardware) module, which, using a certain set of signals and following a predefined protocol, communicates with another chip and/or with another sub-system which may be deployed on the same system board; and/or
a peripheral function, e.g. a timer, or a functional module controlling access to a nonvolatile memory, e.g. OTP; Watchdog timer; interrupt controller; DMA controller.

Each output signal generated by a given functional module is typically indicative of that functional module's current state or of what that functional module's state is about to be (e.g. the state that the functional module is about to transition to). For example, the functional module may comprise a processor core which generates output indicating which instructions the processor core is about to execute. The functional module may generate output indicating which state (e.g. active vs. inactive) the functional module is about to transition to. The functional module may generate output indicating that a specific activity, such as cryptographic activity, is about to begin being executed by the functional module or the cryptographic activity may be about to end, in the functional module.

Typically, each time the module remains in the same state (each time the next state is unchanged relative to the current state), the output signals remain unchanged. In such cases, the next sensitivity level to be selected, insofar as it is to be affected by the subject module, may be the current sensitivity level.

Figure 9:
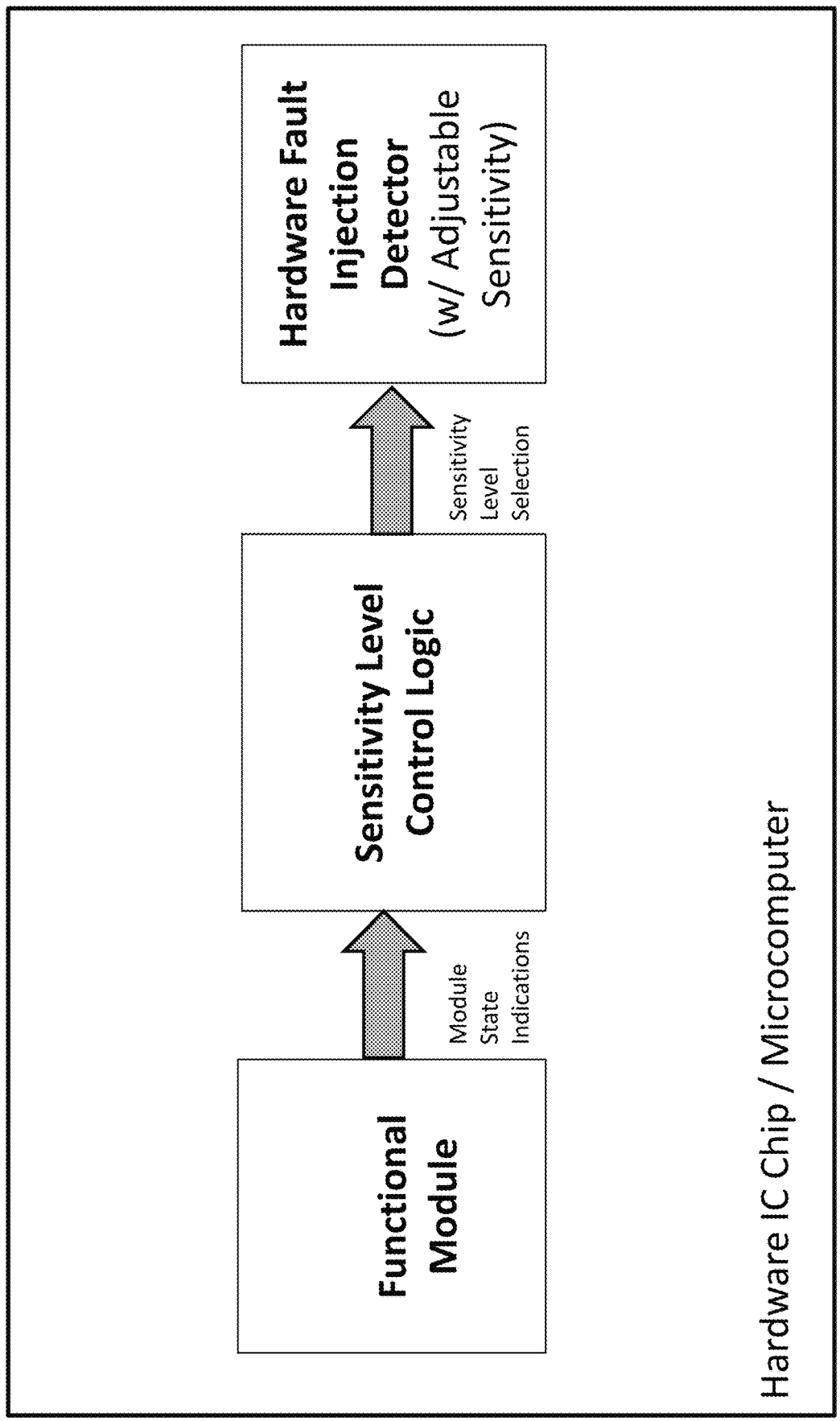
FIG. 9 is a simplified diagram of a single-single-single embodiment of the present invention.
Figure 10:
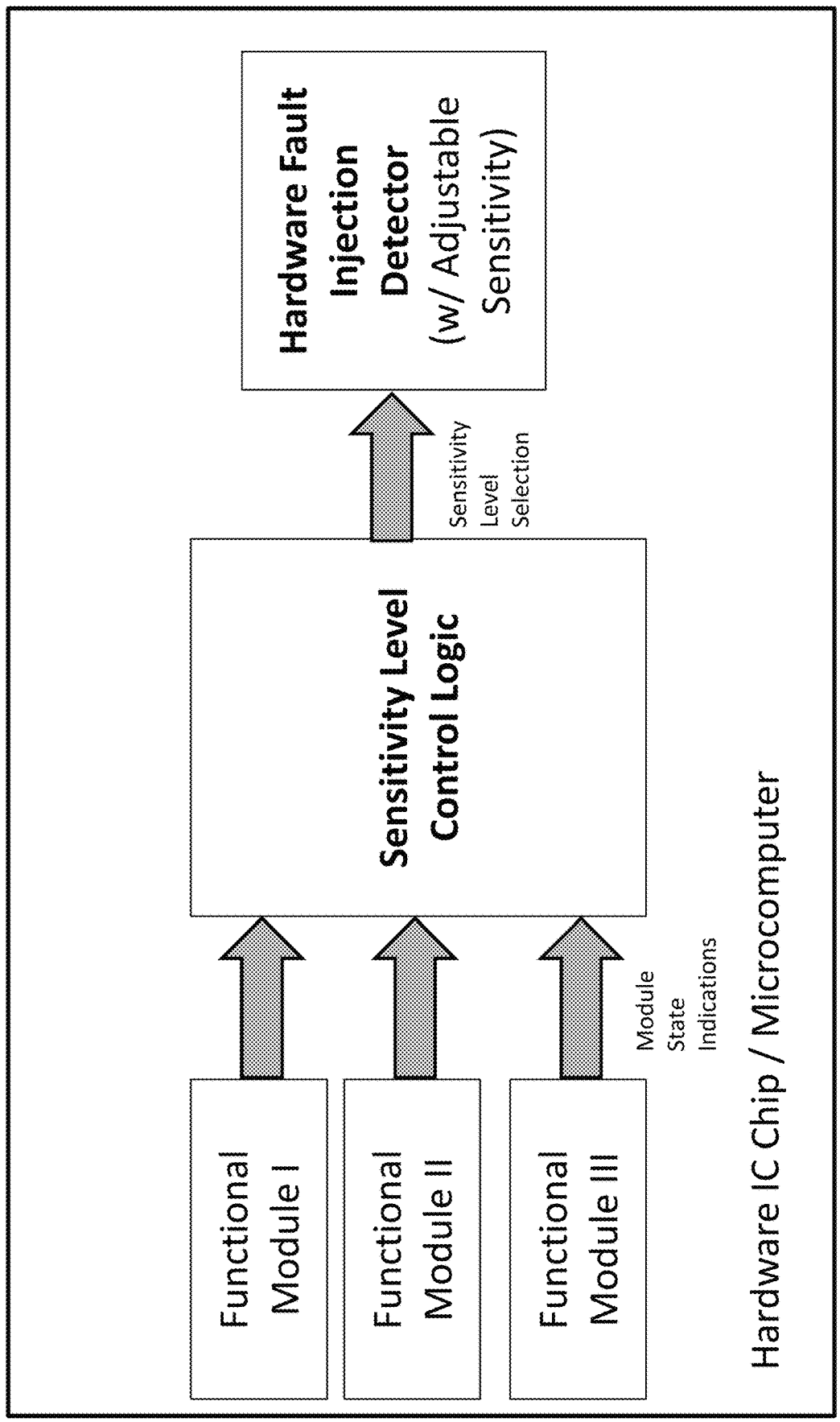
FIG. 10 is a simplified diagram of a multiple-single-single embodiment of the present invention.
Figure 11:
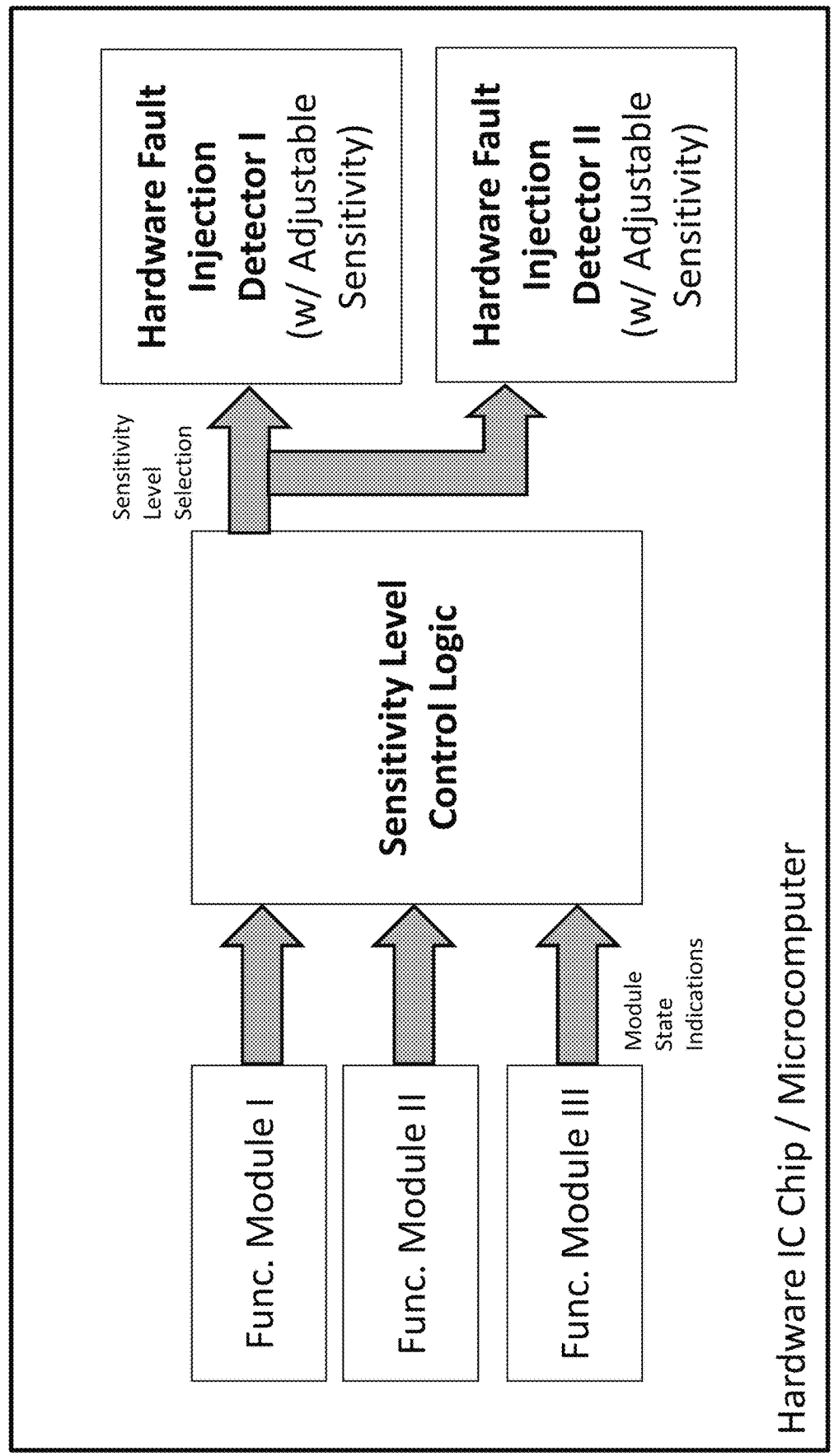
FIG. 11 is a simplified diagram of a multiple-single-multiple embodiment of the present invention.
Figure 12:
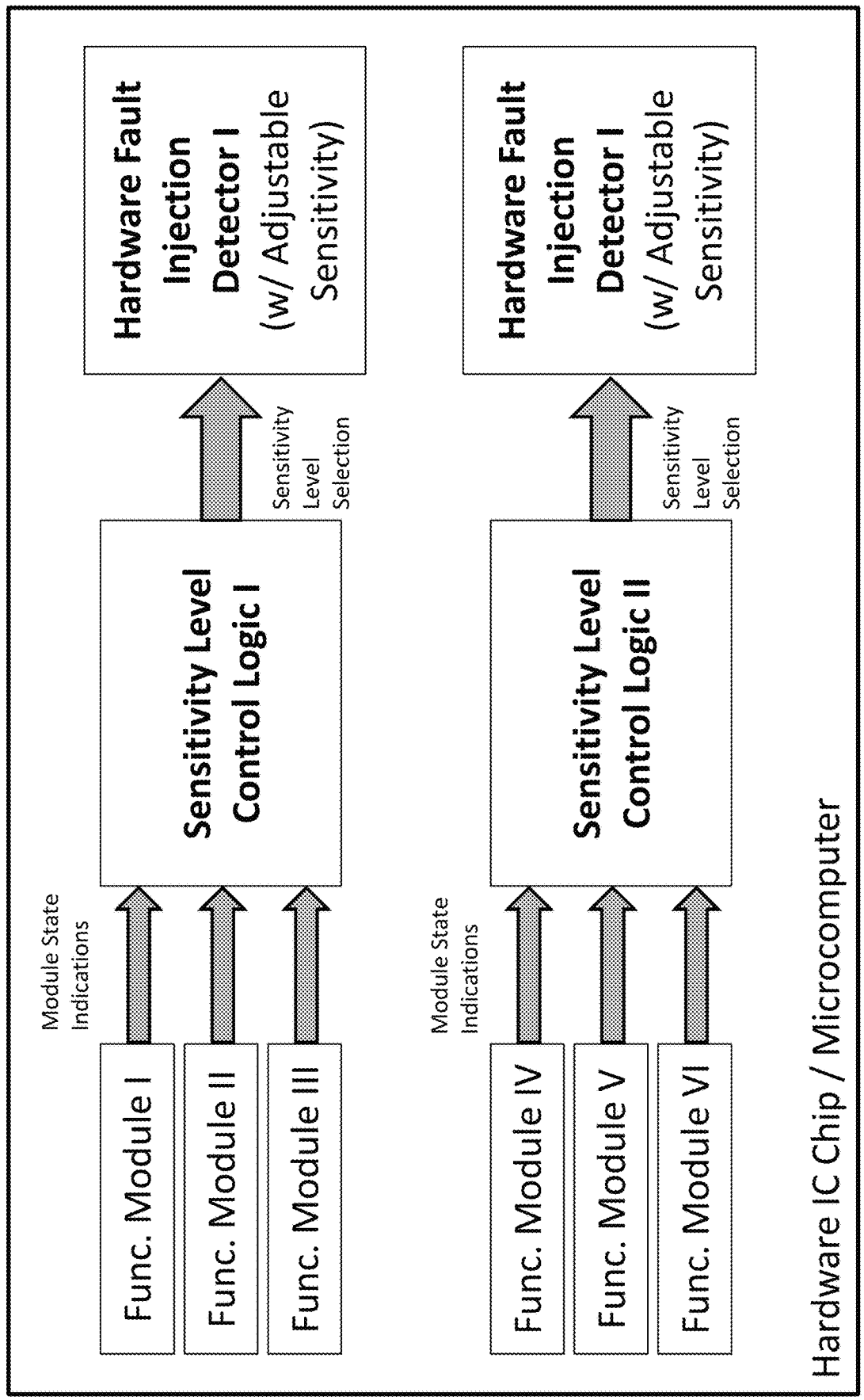
FIG. 12 is a simplified diagram of an embodiment including plural multiple-single-single components, constructed and operative in accordance with yet another embodiment of the present invention.

It is appreciated that a chip may include any suitable number of fault injection detection subsystems, each of which may include any suitable number of hardware fault injection detector circuit/s, coupled to sensitivity level control logic, and may include any suitable number of functional module/s. For example, FIG. 9 illustrates a chip on which a single subsystem including a single functional module and a single detector, is deployed. In FIG. 10, a single fault injection detection subsystem is deployed on the chip, however, FIG. 11's subsystem includes 3 functional modules rather than one. In FIG. 12, a single fault injection detection subsystem is deployed on the chip, and as in FIG. 10, the subsystem includes 3 functional modules rather than one, however in FIG. 11, the subsystem includes 2 detector circuits rather than one. FIG. 12 illustrates a chip on which two subsystems are deployed, each of which includes 3 functional modules and a single detector.

So for example, the at least one functional module/s may comprise plural functional modules and the sensitivity control logic may derive a sensitivity level to be selected as the next level by combining output indications from each of the plural functional modules, into a single set of sensitivity control signals.

Typically, each set of signals includes a multi-bit sensitivity control signal. Typically, plural fault injection detection subsystems are provided, each configured for deployment on the chip and each including at least one hardware fault injection detector and sensitivity level control logic coupled thereto.

According to certain embodiments, the system is deployed on the chip to be protected, and the at least one functional module/s comprise at least first and second functional modules. Typically, the plural subsystems include first and second subsystems which respectively protect the first and second functional modules and the first module is closer to the first subsystem than is the second functional module, and the second functional module is closer to the second subsystem than is the first functional module.

It is appreciated that fault injection is applied electrically and physically to the vicinity of the chip circuitry that is being targeted. Thus proximity between a functional module and a detector "responsible" for protecting that module is desirable, to allow the detector (fault injection detector circuit) to effectively intercept relevant activity which might be a fault injection attempt. If desired, the distance between functional modules and a given subsystem's detectors (e.g. to determine which functional modules are closer to which subsystems) may be defined as the distance between the detector's location on the chip, and a "weighted center" of the functional module's logic, where the weighted center" refers to a point within the functional module's logic for which the square root of the sum of squared distances from that point to each and every element included in the functional module (e.g. to each and every logic gate from among, say 10 k logic gates included in a given functional module), is minimal, relative to the analogous square roots of all other points within the functional module's logic respectively.

Typically, at least one subsystem S from among the plural fault injection detection subsystems protects at least one functional module on the chip. Typically, each individual detector from among the plural subsystems' respective hardware fault injection detectors has a sensitivity level selected, in real time, by at least one functional module which is protected by the individual detector.

There may be an exclusive association between specific functional modules and a specific detector. However, in the general case, each functional module may affect (e.g. select a sensitivity level for) more than one detector, and each detector may be affected by more than one functional module e.g. a given detector's sensitivity level may be selected by combining outputs generated by plural functional modules, typically those functional modules which are protected by (e.g. are within the detection range of) that detector.

Typically, each of the detector/s has plural sensitivity levels which are selectable in real time.

According to certain embodiments, the sensitivity level control logic selects the controllable sensitivity level in real time depending at least partly on whether or not certain on-chip modules are active.

The controllable sensitivity level may, for example, be selected by the sensitivity level control logic to be lower, when certain on-chip modules are active, than the controllable sensitivity level which is selected by the mechanism when the certain on-chip modules are not active.

And/or, the controllable sensitivity level may for example be selected by the sensitivity level control logic to be higher, when given on-chip modules are active, than the controllable sensitivity level which is selected by the sensitivity level control logic when the given on-chip modules are not active.

The on-chip modules may for example comprise:

a. A communication module which conducts communication which when operative is deemed security-critical, such as, for example, a transmitter, which might be used to transmit outside the chip data considered confidential, or a receiver which might be used to receive data which then critically affect correct execution of chip tasks.

b. A GPIO module, deemed security critical, which controls and monitors certain IO signals such as, for example, controlling output signals of the chip which enable certain functions outside the chip, which, critically, must not be enabled unless a certain security criterion, e.g. successful password authentication, is true. which when operative is.

c. A specific memory interface module, which, when dealing with a predefined memory zone is deemed security-critical. For example, access to a given memory zone used to store critical or secret information may be deemed security-critical. This zone starts at address A and ends at address B; both of these may be programmable. A decoder knows or determines that an addressing within that zone is being accessed and, responsively, may output a signal fed to the sensitivity control logic, telling the sensitivity control logic to elevate its sensitivity level so as to yield elevated security secure when fetching data from that memory zone.

d. A self-test module, e.g. one testing a certain memory array, which when operative is deemed security-critical. it is appreciated that memory faults can cause security problems thus some conventional security systems implement self-tests of certain element/s before starting to use the tested element/s. Disturbing such self-test can cause the security system to malfunction, non-critically or critically depending on the criticality of the tested element/s.

a module is typically deemed critical or security-critical if that module, when disturbed, or hacked, has a critical effect on the security of the chip because it adversely affects the chip's operation to a critical extent, thereby creating risk.

It is appreciated that the decision re what is critical, may be made at any suitable stage. For example, the architect of the chip may decide which elements or functional modules are critical, or may decide which elements or functional modules (all or any subsets of the chip's elements or functional modules) may be considered critical, leaving freedom of decision to a later stage, by users of the chip, e.g. a designer of the system, who may subsequently decide what to enable.

According to certain embodiments, a decision on what is critical is programmed and configured during IC (integrated circuit) initialization, and then kept fixed through the operation of the design.

According to certain embodiments, e.g. for a system including CM and sensitivity control, sensitivity may be set to a given (e.g. maximum) value, until set otherwise by the IC's firmware. Since configuration is a critical phase, this embodiment allows configuration to be highly secured before releasing CMs to function at a normal level which typically would be less secure than the level of security which is set for the configuration phase.

According to certain embodiments, certain elements or functional modules are configured to have an ability to indicate to the sensitivity control whether they are currently active or inactive. For example, a given function such as a cryptographic accelerator may generate an output signal each time the accelerator is actively conducting cryptographic activity. This output may be connected to the sensitivity control logic, which, responsively, may set the level of countermeasure circuitry sensitivity accordingly.

It is appreciated that any suitable technology may be used to ensure that a given element or functional module knows whether or not it is active. For example, crypto accelerators typically load data to be processed, and then are goaded into action by setting a "start" or "go" bit. Such an accelerator may then be considered active once the data has loaded or once the start/go has been kicked, and inactive until the data has been loaded, or until the start/go has been kicked. a communication module may know that it has started communicating when the state (aka "transmit-start" state) in its internal state-machine has been arrived at, and may know that it is not actively communicating if the communication module is not in the transmit-start" state.

According to certain embodiments, at least one functional module is operative to generate, and to feed to the sensitivity level control logic, at least one output signal comprising a status indication which indicates whether or not the module is active. Typically, the logic selects the next level depending at least partly on the status indication.

according to certain embodiments, the next level is selected to be a given level if and only if the module is active. According to other embodiments, the next level depends both on whether or not the module is active, and on other factors such as whether the module is a high risk module or a low risk module (which may for example require a less high level of sensitivity, relative to the high risk module, even if active).

According to certain embodiments, the logic, at least once, selects a higher next level responsive to the at least one individual module from among the functional modules becoming active.

According to certain embodiments, the logic, at least once, releases to a level which is lower than the higher next level, responsive to at least the individual module becoming inactive.

It is appreciated that releasing to a lower sensitivity level may occur if no other module calls for the higher sensitivity level and may not occur if any other module does call for the higher (e.g. current) sensitivity level. Conversely, a single module requiring elevation of sensitivity level may result in elevation of sensitivity to the higher level.

Thus the system may take advantage of the fact that often, out of 100% of system operation time, there are periods of lower security risk, such as but not limited to periods which, empirically, have been observed to be less popular for hacking, and/or periods which cause a less negative outcome per attack, even if attacks do occur, and there are periods of higher security risk, such as but not limited to periods which, empirically, have been observed to be more popular for hacking and/or periods which cause a more negative outcome per attack. The system then restricts the time during which a system is more sensitive to security threats, to the second type of period, thereby reducing the system's susceptibility to false alarms in total, making the system more secure while not affecting availability and usability relative to placing the system in highest sensitivity to fault injection 100% of the time.

According to certain embodiments, the at least one output signal represents a level of risk associated with a current activity of the at least one functional module. Typically, the sensitivity control logic derives, at least partly from the level of risk, a sensitivity level to be selected as the next level.

Typically, chip architects and designers determine a suitable risk ranking in advance (e.g.: determine that cryptographic activity is the highest risk activity, etc.) and then design accordingly, to provide the sensitivity level control logic with status signals or output signals to monitor in real time, allowing the logic to adjust the sensitivity level control signals accordingly, also in real time. For example, if it is desired to determine sensitivity level based on whether given module/s are active/inactive, these modules may be designed to provide a single binary output signal indicating (e.g. changing in real time) whether the module is doing something, or is idle at any given time. For multiple (n>2) levels of risk rating, the designer may provide a decision for each of plural modules such that each module's state carries the relevant information.

According to certain embodiments, the logic selects a first sensitivity level as the next level if the functional module is active and has a first level of risk, a second sensitivity level as the next level if the functional module is active and has a second level of risk, lower than the first level of risk, and a third sensitivity level as the next level if the functional module is inactive.

It is appreciated that any suitable number of risk levels may be provided, such as 2 or 3 or 4 or more risk levels, typically depending on the number of sensitivity levels that the chip design provides (or, the chip is designed to provide enough sensitivity levels to accommodate whichever resolution of risk levelling is desired).

It is appreciated that it is sometimes possible for an attacker to know when crypto activity is occurring, in which case it may be particularly important for the CM to be more sensitive at such times, so as to have greater protection at such times. Thus according to certain embodiments, sensitivity level control logic selects the controllable sensitivity level in real time depending at least partly on whether or not the chip is executing crypto acceleration.

According to certain embodiments the functional module comprises a cryptographic module which is associated with a high level of risk.

The controllable sensitivity level may for example be forced, by the sensitivity level control logic, when the CPU is executing crypto acceleration, to a sensitivity level H which is higher than the controllable sensitivity level which is forced, by the sensitivity level control logic, when the CPU is not executing crypto acceleration.

The term higher sensitivity means that more events are diagnosed as fault injection, than would be diagnosed as fault injection when the system's sensitivity level is lower. Typically, an attacker tries to study when the target device is performing various operations (such as but not limited to cryptographic activity, sensitive communication activity such as conveying social security numbers or other sensitive data; access to certain memory ranges—which basically makes yet another embodiment; performing certain measurements/sensing related to security; clocking circuitry being in the state of locking-in/tuning]) and then decides when to attack on that basis, depending on what the attacker seeks to accomplish. For example, if the attacker seeks to fool the system into assuming a certain piece of software (malware injected by the attacker e.g.) is authentic although it is not, the attacker may time his attack during what he knows or believes to be a time of cryptographic activity.

Typically, when cryptographic activity is being performed, the system switches to a higher sensitivity level, despite the higher level of false positives that this involves, and after the cryptographic activity has been performed, the system switches back to a lower sensitivity level.

According to certain embodiments, sensitivity level control logic selects the controllable sensitivity level in real time, depending at least partly on a power state of the chip.

The controllable sensitivity level may be selected by the sensitivity level control logic to be lower, or higher, when the CPU is in an idle power state, than the controllable sensitivity level which is selected by the sensitivity level control logic when the CPU is in an active power state. The system may force a first level of sensitivity when idle, and a second, higher level of sensitivity when active, e.g. because if the chip is asleep, there is less concern about it being attacked. Or, the system may force a second, lower level of sensitivity when active e.g. because it is risky or undesirable to carry out un-necessarily fault detection remediation actions which typically greatly burden the normal operation of the chip.

According to certain embodiments, the CM is always active, however its sensitivity level changes over time since the CM's sensitivity level is sometimes automatically reduced by the hardware shown and described herein.

It is appreciated that some power state transitions are known to firmware, such as for example power state transitions triggered by firmware e.g. firmware which puts a chip in some idle state by writing something to a control register.

Thus, according to an embodiment, the functional module comprises firmware which triggers transitions between the possible power states thereby to cause the current state to be known to the sensitivity control logic.

It is appreciated that power state transitions can be known to firmware even if the transitions are not triggered by that firmware. For example, exiting a low power state is typically triggered by hardware, e.g. a timer, or an external event. in this case the event may trigger an interrupt, by which the firmware is notified of the wake-up.

In these cases, the firmware may be configured (e.g. by the firmware designer) to include selection of sensitivity level in real time depending at least partly on the known current power state.

Alternatively, e.g. if the firmware is unaware of certain changes in power state, these changes aka transitions may produce control signals which may reduce the sensitivity level.

According to certain embodiments, the chip has multiple possible power states including at least one idle state/s and at least one awake state/s. Typically, the logic selects the next level responsive to a new state of the chip, the new state comprising one of the multiple possible states.

In this embodiment the functional modules may be termed power management modules, or power control modules. Such modules typically do not produce or process anything or move anything from one place to another, and instead collect various indications that exist in the chip and, accordingly, control the state of the chip and its modules. For example, a power management or power control module (logic) may put the chip to sleep and/or may disable certain other functions, upon detection of a specific, typically pre-defined "go to sleep" CPU instruction. Typically, the firmware puts the chip to sleep. Upon executing such an instruction, the CPU may put itself to sleep, and may also issue a signal, responsive to which power management logic may put other portions or functional elements of the chip to sleep.

The next level may be selected before the chip's power state transitions to the new state. The detector may be set to the next level before the chip's power state transitions to the new state. The next level may be selected after the chip's power state has transitioned to the new state.

The detector may be set to the next level after the chip's power state has transitioned to the new state.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Features of the present invention, including operations, which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to those described in the Background section or in publications mentioned therein. Conversely, features of the invention, including operations, described for brevity in the context of a single embodiment or in a certain order, may be provided separately or in any suitable subcombination, including with features known in the art (particularly although not limited to those described in the Background section or in publications mentioned therein) or in a different order. "e.g." is used to denote an example not intended to be limiting. Each method may comprise some or all of the operations illustrated or described, suitably ordered e.g. as illustrated or described herein.

The invention claimed is:

1. A security system configured for deployment on a chip which is to be protected, the system comprising:
at least one fault injection detection subsystem configured for deployment on the chip, each said fault injection detection subsystem having plural sensitivity levels which are selectable in real time and comprising:
at least one hardware fault injection detector circuit/s, configured for deployment on the chip,
and, coupled thereto,
fault injection detection sensitivity level control logic configured for deployment on the chip and operative, in real time, to transition the fault injection detection subsystem, from its current fault injection detection sensitivity level from among said plural selectable fault injection detection sensitivity levels, to a next fault injection detection sensitivity level from among said plural selectable fault injection detection sensitivity levels, by generating fault injection detection sensitivity control signals including fault injection detection sensitivity level selections, and feeding the fault injection detection sensitivity control signals to at least one hardware fault injection detector in the fault injection detection subsystem,
wherein the fault injection detection subsystem has a response time comprising a time-period which elapses from an indication, comprising an opcode indicative of a required sensitivity level for the fault injection detection subsystem, which is provided to sensitivity level selection logic employed by said sensitivity level control logic, and until the fault injection detection subsystem is set at the required sensitivity level, and the chip being protected has a decode-execution cycle, for each single instruction the chip executes, and wherein said response time is shorter than said decode-execution cycle, wherein the plural fault injection detection sensitivity levels include:
a first level of fault injection detection sensitivity; and
a second level of fault injection detection sensitivity higher than the first level of fault injection detection sensitivity, and wherein the fault injection detection subsystem, when at the second, higher, of fault injection detection sensitivity level, detects more events as fault injections, than would be detected as fault injections when the system's fault injection detection sensitivity level is at the first, lower level.

2. The system of claim 1 and wherein said at least one fault injection subsystem also comprises:
at least one functional module/s configured for deployment on the chip which generate/s output signal/s in real time, and feeds said output signals to said sensitivity level control logic thereby to provide said sensitivity level control logic with indications as to the next sensitivity level to be selected from among said plural selectable sensitivity levels.

3. The system of claim 2 wherein said at least one functional module is operative to generate, and to feed to said sensitivity level control logic, at least one output signal comprising a status indication which indicates whether or not said module is active, and wherein said logic selects said next level depending at least partly on said status indication.

4. The system of claim 3 wherein said logic, at least once, selects a higher next level responsive to said at least one individual module from among said functional modules becoming active.

5. The system of claim 3 wherein the at least one output signal represents a level of risk associated with a current activity of said at least one functional module and wherein the sensitivity control logic derives, at least partly from the level of risk, a sensitivity level to be selected as the next level.

6. The system of claim 5 wherein said logic selects a first sensitivity level as said next level if said functional module is active and has a first level of risk, a second sensitivity level as said next level if said functional module is active and has a second level of risk, lower than said first level of risk, and a third sensitivity level as said next level if said functional module is inactive.

7. The system of claim 1 wherein said chip has multiple possible power states including at least one idle state/s and at least one awake state/s and wherein said logic selects said next level responsive to a new state of the chip, the new state comprising one of said multiple possible states.

8. The system of claim 7 wherein said functional module comprises firmware which triggers transitions between said possible power states thereby to cause said current state to be known to said sensitivity control logic.

9. The system of claim 7 wherein the next level is selected before the chip's power state transitions to said new state.

10. The system of claim 9 wherein the detector is set to said next level before the chip's power state transitions to said new state.

11. The system of claim 7 wherein the next level is selected after the chip's power state has transitioned to said new state.

12. The system of claim 11 wherein the detector is set to said next level after the chip's power state has transitioned to said new state.

13. The system of claim 1 wherein said system is deployed on said chip to be protected.

14. The system of claim 2 wherein said at least one fault injection detection subsystem comprises plural fault injection detection subsystems, each configured for deployment on the chip and each including a hardware fault injection detector and sensitivity level control logic coupled thereto.

15. The system of claim 14 wherein said system is deployed on said chip to be protected, wherein said at least one functional module/s comprise at least first and second functional modules, and wherein the plural subsystems include first and second subsystems which are respectively protecting said first and second functional modules and wherein the first module is closer to the first subsystem than is the second module, and the second module is closer to the second subsystem than is the first module.

16. The system of claim 14 and wherein at least one subsystem from among said plural fault injection detection subsystems protects at least one functional module on the chip, and wherein each individual detector from among the plural subsystems' respective hardware fault injection detectors has a sensitivity level selected, in real time, by at least one functional module which is protected by said individual detector.

17. The system of claim 16 and wherein each of the detector/s has plural sensitivity levels which are selectable in real time.

18. The system of claim 1 and wherein said subsystem comprises plural detectors and wherein the sensitivity level of said subsystem at time t is implemented as a number of detectors, from among said plural detectors, which are enabled at said time t and wherein said sensitivity control logic determines how many of the plural detectors are enabled at time t, thereby to provide a counter-measure with a real-time configurable sensitivity level such that lower sensitivity levels are implemented by smaller numbers of activated detector circuits, and higher sensitivity levels are implemented by larger numbers of activated detector circuit.

19. The system of claim 2 wherein said at least one functional module/s comprises plural functional modules and wherein said sensitivity control logic derives a sensitivity level to be selected as the next level by combining output indications from each of said plural functional modules, into a single set of sensitivity control signals.

20. The system of claim 4 wherein said logic, at least once, releases to a level which is lower than said higher next level, responsive to at least said individual module becoming inactive.

21. The system of claim 3 wherein said functional module comprises a cryptographic module which is associated with a high level of risk.

22. A chip protection method comprising:
providing at least one fault injection detection subsystem configured for deployment on the chip, each said fault injection detection subsystem having plural sensitivity levels which are selectable in real time, said providing comprising:
deploying at least one hardware fault injection detector circuit/s on the chip, and,
coupling, to said hardware fault injection detector circuit/s, fault injection detection sensitivity level control logic configured for deployment on the chip and operative, in real time, to transition the fault injection detection subsystem from its current fault injection detection sensitivity level from among said plural selectable fault injection detection sensitivity levels, to a next fault injection detection sensitivity level from among said plural selectable fault injection detection sensitivity levels, by generating fault injection detection sensitivity control signals including fault injection detection sensitivity level selections and feeding the fault injection detection sensitivity control signals to at least one hardware fault injection detector in the fault injection detection subsystem, wherein the fault injection detection subsystem has a response time comprising a time-period which elapses from an indication, comprising an opcode indicative of a required sensitivity level for the fault injection detection subsystem, which is provided to sensitivity level selection logic employed by said sensitivity level control logic, and until the fault injection detection subsystem is set at the required sensitivity level, and the chip being protected has a decode-execution cycle, for each single instruction the chip executes, and wherein said response time is shorter than said decode-execution cycle, wherein the plural fault injection detection sensitivity levels include:
  a first level of fault injection detection sensitivity; and
  a second level of fault injection detection sensitivity higher than the first level of fault injection detection sensitivity, and wherein the fault injection detection subsystem, when at the second, higher, of fault injection detection sensitivity level, detects more events as fault injections, than would be detected as fault injections when the system's fault injection detection sensitivity level is at the first, lower level.

* * * * *